US012223971B2

(12) United States Patent
Kikuiri et al.

(10) Patent No.: US 12,223,971 B2
(45) Date of Patent: *Feb. 11, 2025

(54) AUDIO DECODING DEVICE, AUDIO ENCODING DEVICE, AUDIO DECODING METHOD, AUDIO ENCODING METHOD, AUDIO DECODING PROGRAM, AND AUDIO ENCODING PROGRAM

(71) Applicant: NTT DOCOMO, INC., Tokyo (JP)

(72) Inventors: Kei Kikuiri, Tokyo (JP); Atsushi Yamaguchi, Tokyo (JP)

(73) Assignee: NTT DOCOMO, INC, Tokyo (JP)

( * ) Notice: Subject to any disclaimer, the term of this patent is extended or adjusted under 35 U.S.C. 154(b) by 265 days.

This patent is subject to a terminal disclaimer.

(21) Appl. No.: 17/874,975

(22) Filed: Jul. 27, 2022

(65) Prior Publication Data

US 2022/0366924 A1 Nov. 17, 2022

Related U.S. Application Data

(63) Continuation of application No. 16/528,163, filed on Jul. 31, 2019, now Pat. No. 11,437,053, which is a (Continued)

(30) Foreign Application Priority Data

Mar. 24, 2014 (JP) ................................ 2014-060650

(51) Int. Cl.
*G10L 19/00* (2013.01)
*G10L 19/02* (2013.01)
(Continued)

(52) U.S. Cl.
CPC .............. *G10L 19/26* (2013.01); *G10L 19/02* (2013.01); *G10L 19/0204* (2013.01); (Continued)

(58) Field of Classification Search
CPC ....... G10L 19/00; G10L 19/167; G10L 19/24; G10L 19/0204; G10L 19/008; G10L 19/02; G10L 21/038; G11B 20/10527
See application file for complete search history.

(56) References Cited

U.S. PATENT DOCUMENTS 7,447,631 B2 11/2008 Truman et al.
10,410,647 B2 * 9/2019 Kikuiri ................ G10L 19/032
(Continued)

FOREIGN PATENT DOCUMENTS

CN 102779523 A 11/2012
JP H9-153811 A 6/1997
(Continued)

OTHER PUBLICATIONS

International Preliminary Report on Patentability in corresponding International Application No. PCT/JP2015/058608, dated Sep. 29, 2016, 4 pages.
(Continued)

*Primary Examiner* — Vu B Hang
(74) *Attorney, Agent, or Firm* — Crowell & Moring LLP

(57) ABSTRACT

The purpose of the present invention is to reduce distortion a frequency band component encoded with a small number of bits in a time domain and improve quality. An audio decoding device (10) decodes an encoded audio signal and outputs the audio signal. A decoding unit (10*a*) decodes an encoded sequence containing an encoded audio signal and obtains a decoded signal. A selective temporal envelope shaping unit (10*b*) shapes a temporal envelope of a decoded signal in the frequency band on the basis of decoding related information concerning decoding of the encoded sequence.

16 Claims, 24 Drawing Sheets

Related U.S. Application Data continuation of application No. 15/128,364, filed as application No. PCT/JP2015/058608 on Mar. 20, 2015, now Pat. No. 10,410,647.

(51) Int. Cl.

| | |
|---|---|
| ***G10L 19/028*** | (2013.01) |
| ***G10L 19/032*** | (2013.01) |
| ***G10L 19/12*** | (2013.01) |
| ***G10L 19/16*** | (2013.01) |
| ***G10L 19/26*** | (2013.01) |
| *G10L 19/24* | (2013.01) |
| *G10L 21/038* | (2013.01) |

(52) U.S. Cl.

CPC .......... *G10L 19/028* (2013.01); *G10L 19/032* (2013.01); *G10L 19/12* (2013.01); *G10L 19/167* (2013.01); *G10L 19/24* (2013.01); *G10L 21/038* (2013.01)

(56) References Cited

U.S. PATENT DOCUMENTS

| | | | |
|---|---|---|---|
| 2012/0010879 | A1 | 1/2012 | Tsujino |
| 2013/0138432 | A1 | 5/2013 | Tsujino et al. |
| 2014/0163972 | A1 | 6/2014 | Tsujino et al. |
| 2015/0051904 | A1 | 2/2015 | Kikuiri et al. |
| 2016/0358615 | A1 | 12/2016 | Tsujino et al. |
| 2016/0365098 | A1 | 12/2016 | Tsujino et al. |
| 2017/0117000 | A1 | 4/2017 | Kikuiri et al. |
| 2017/0301363 | A1 | 10/2017 | Kikuiri et al. |
| 2019/0355371 | A1 | 11/2019 | Kikuiri et al. |

FOREIGN PATENT DOCUMENTS

| | | | |
|---|---|---|---|
| JP | 2009-530679 | A | 8/2009 |
| JP | 2012-053493 | A | 3/2012 |
| JP | 5203077 | B2 | 6/2013 |
| JP | 2013-242514 | A | 12/2013 |
| KR | 10-1782935 | | 9/2017 |
| WO | WO 2013/161592 | A1 | 10/2013 |

OTHER PUBLICATIONS

"Information Technology—MPEG Audio Technologies Part 3: Unified Speech and Usdio Coding.", ISO/IEC FDIS 23003-3:2011(E),ISO/IEC JTC 1/SC 29/WG 11, Sep. 20, 2011, 291 pages.

International Organisation for Standardisation, "Text of ISO/IEC13818-7:2004 (MPEG-2 AAC 3rd edition)", ISO/IEC JTC1/SC29/WG11 N6428, Mar. 2004, 198 pages.

Marina Bosi et. al., "ISO/IEC MPEG-2 Advanced Audio Coding", Journal of the Audio Engineering Society, vol. 45, No. 10, 1997. pp. 789-814.

Office Action and English language translation thereof, in corresponding Korean Application No. 10-2016-7026675, dated Jan. 10, 2017, 12 pages.

Technical Specification, "Audio Codec Processing Functions, Extended Adaptive Multi-Rate Wideband ($AMR-WB_+$) Codec.", 3GPP TS 26.290 version 9.0.0, Release 9, 2009, 85 pages.

Office Action, and English language translation thereof, in corresponding Korean Application No. 10-2017-7026665, dated Oct. 17, 2017, 7 pages.

Office Action, and English language translation thereof, in corresponding Japanese Application No. P2016-212827, dated Jan. 9, 2018, 6 pages.

Search Report, and English language translation thereof, in corresponding International Application No. PCT/JP2015/058608, dated Jun. 2, 2015, 8 pages.

Korean Patent Office, Notice of Final Rejection/Office Action in Korean Application No. 10-2017-7026665 dated Apr. 23, 2018, pp. 1-7.

Office Action in Japanese Application No. 2016-212827, including English translation, dated Aug. 21, 2018, pp. 1-6.

Canadian Office Action, dated Nov. 2, 2018, pp. 1-4, issued in Canadian Patent Application No. 2,990,392, Canadian Intellectual Property Office, Gatineau, Quebec, Canada.

Taiwan Office Action with English translation, dated Nov. 9, 2018, pp. 1-8, issued in Taiwan Patent Application No. 106133758, Taiwan Intellectual Property Office, Taipei, Taiwan.

Korean Office Action with English translation, dated Dec. 14, 2018, pp. 1-14, issued in Korean Patent Application No. 10-2018-7028501, Korean Intellectual Property Office, Daejeon, Republic of Korea.

Australian Office Action, dated Feb. 21, 2019, pp. 1-6, issued in Australian Patent Application No. 2018201468, Offices of IP Australia, Woden, ACT, Australia.

Indonesia Office Action with English translation, dated Jun. 19, 2019, pp. 1-5, issued in Indonesia Patent Application No. P00201607027, Directorate General of Intellectual Property, South Jakarta, Indonesia.

Canadian Office Action, dated Sep. 17, 2019, pp. 1-4, issued in Canadian Patent Application No. 2,990,392, Canadian Intellectual Property Office, Gatineau, Quebec, Canada.

India Office Action, dated Oct. 7, 2019, pp. 1-6, issued in India Patent Aoolication No. 201647032970, Intellectual Property India, Chennai, India.

Extended European Search Report, dated Feb. 10, 2020, pp. 1-9, issued in European Patent Application No. 192055960, European Patent Office, The Hague, The Netherlands.

Herre, J., "Temporal Noise Shaping, Quantization and Coding Methods in Perceptual Audio Coding: A Tutorial Introduction," dated Sep. 2, 1999, pp. 312-325, High Quality Audio Coding, The Proceedings of the AES $17^{th}$ International Conference, Sep. 2-5, 1999, Florence, Italy. XP008123769. ISBN: 978-0-937803-38-7.

Korean Notification of Reason for Refusal Office Action with English translation, dated Sep. 5, 2020, pp. 1-8, issued in Korean Application No. 10-2020-7017473, Korean Intellectual Property Office, Daejeon, South Korea.

Canadian Office Action, dated Sep. 4, 2020, pp.1-4, issued in Canadian Patent Application No. 2,990,392, Canadian Intellectual Property Office, Gatineau, Quebec, Canada.

Office Action in China Application No. 2017109756696, dated Feb. 3, 2021, 14 pages.

Office Action in Mexico Patent Application No. MX/a/2018/002676, dated Apr. 13, 2021, 11 paqes.

Office Action in China Application No. 2017109756696, including English translation, dated Jul. 20, 2021, 13 pages.

Office Action in Australia Application No. 2021200603, dated Dec. 8, 2021, 2 paqes.

Office Action in Australia Application No. 2021200604, dated Dec. 10, 2021, 2 paqes.

Office Action in Australia Application No. 2021200607, dated Dec. 10, 2021, 2 paqes.

Chinese Office Action with translation, dated Nov. 19, 2021, pp. 1-15, issued in Chinese Patent Application No. 2017109756696, China National Intellectual Property Administration, Beijing, China.

* cited by examiner

AUDIO DECODING DEVICE, AUDIO ENCODING DEVICE, AUDIO DECODING METHOD, AUDIO ENCODING METHOD, AUDIO DECODING PROGRAM, AND AUDIO ENCODING PROGRAM

PRIORITY CLAIM

This application is a continuation of U.S. patent application Ser. No. 16/528,163, filed Jul. 31, 2019, which is a continuation of U.S. patent application Ser. No. 15/128,364, filed Sep. 22, 2016, which is a 371 of International Patent Application No. PCT/JP2015/058608, filed Mar. 20, 2015, which claims the benefit of priority of Japanese Patent Application No. 2014-060650, filed Mar. 24, 2014, all of which are incorporated by reference.

TECHNICAL FIELD

The present invention relates to an audio decoding device, an audio encoding device, an audio decoding method, an audio encoding method, an audio decoding program, and an audio encoding program.

BACKGROUND ART

Audio coding technology that compresses the amount of data of an audio signal or an acoustic signal to one-several tenths of its original size is significantly important in the context of transmitting and accumulating signals. One example of widely used audio coding technology is transform coding that encodes a signal in a frequency domain.

In transform coding, adaptive bit allocation that allocates bits needed for encoding for each frequency band in accordance with an input signal is widely used to obtain high quality at a low bit rate. The bit allocation technique that minimizes the distortion due to encoding is allocation in accordance with the signal power of each frequency band, and bit allocation that takes the human sense of hearing into consideration is also done.

On the other hand, there is a technique for improving the quality of a frequency band(s) with a very small number of allocated bits. Patent Literature 1 discloses a technique that makes approximation of a transform coefficient(s) in a frequency band(s) where the number of allocated bits is smaller than a specified threshold to a transform coefficient(s) in another frequency band(s). Patent Literature 2 discloses a technique that generates a pseudo-noise signal and a technique that reproduces a signal with a component that is not quantized to zero in another frequency band(s), for a component that is quantized to zero because of a small power in a frequency band(s).

Further, in consideration of the fact that the power of an audio signal and an acoustic signal is generally higher in a low frequency band(s) than in a high frequency band(s), which has a significant effect on the subjective quality, bandwidth extension that generates a high frequency band(s) of an input signal by using an encoded low frequency band(s) is widely used. Because the bandwidth extension can generate a high frequency band(s) with a small number of bits, it is possible to obtain high quality at a low bit rate. Patent Literature 3 discloses a technique that generates a high frequency band(s) by reproducing the spectrum of a low frequency band(s) in a high frequency band(s) and then adjusting the spectrum shape based on information concerning the characteristics of the high frequency band(s) spectrum transmitted from an encoder.

CITATION LIST

Patent Literature

PTL1: Japanese Unexamined Patent Publication No. H9-153811
PTL2: U.S. Pat. No. 7,447,631
PTL3: Japanese Patent No. 5203077

SUMMARY OF INVENTION

Technical Problem

In the above-described technique, the component of a frequency band(s) that is encoded with a small number of bits is similar to the corresponding component of the original sound in the frequency domain. On the other hand, distortion is significant in the time domain, which can cause degradation in quality.

In view of the foregoing, it is an object of the present invention to provide an audio decoding device, an audio encoding device, an audio decoding method, an audio encoding method, an audio decoding program, and an audio encoding program that can reduce the distortion of a frequency band(s) component encoded with a small number of bits in the time domain and thereby improve the quality.

Solution to Problem

To solve the above problem, an audio decoding device according to one aspect of the present invention is an audio decoding device that decodes an encoded audio signal and outputs the audio signal, including a decoding unit configured to decode an encoded sequence containing the encoded audio signal and obtain a decoded signal, and a selective temporal envelope shaping unit configured to shape a temporal envelope of a decoded signal in a frequency band based on decoding related information concerning decoding of the encoded sequence. The temporal envelope of a signal indicates the variation of the energy or power (and a parameter equivalent to those) of the signal in the time direction. In this configuration, it is possible to shape the temporal envelope of a decoded signal in a frequency band encoded with a small number of bits into a desired temporal envelop and thereby improve the quality.

Further, an audio decoding device according to one aspect of the present invention is an audio decoding device that decodes an encoded audio signal and outputs the audio signal, including a demultiplexing unit configured to divide an encoded sequence containing the encoded audio signal and temporal envelope information concerning a temporal envelope of the audio signal, a decoding unit configured to decode the encoded sequence and obtain a decoded signal, and a selective temporal envelope shaping unit configured to shape a temporal envelope of a decoded signal in a frequency band based on at least one of the temporal envelope information and decoding related information concerning decoding of the encoded sequence. In this configuration, it is possible to shape the temporal envelope of a decoded signal in a frequency band encoded with a small number of bits into a desired temporal envelop based on the temporal envelope information generated in an audio encoding device that generates and outputs the encoded sequence of the audio signal by referring to the audio signal that is input to the audio encoding device, and thereby improve the quality.

The decoding unit may include a decoding/inverse quantization unit configured to perform at least one of decoding and inverse quantization of the encoded sequence and obtain a frequency-domain decoded signal, a decoding related information output unit configured to output, as decoding related information, at least one of information obtained in the course of at least one of decoding and inverse quantization in the decoding/inverse quantization unit and information obtained by analyzing the encoded sequence, and a time-frequency inverse transform unit configured to transform the frequency-domain decoded signal into a time-domain signal and output the signal. In this configuration, it is possible to shape the temporal envelope of a decoded signal in a frequency band encoded with a small number of bits into a desired temporal envelop and thereby improve the quality.

Further, the decoding unit may include an encoded sequence analysis unit configured to divide the encoded sequence into a first encoded sequence and a second encoded sequence, a first decoding unit configured to perform at least one of decoding and inverse quantization of the first encoded sequence, obtain a first decoded signal, and obtain first decoding related information as the decoding related information, and a second decoding unit configured to obtain and output a second decoded signal by using at least one of the second encoded sequence and the first decoded signal, and output second decoding related information as the decoding related information. In this configuration, when a decoded signal is generated by being decoded in a plurality of decoding units also, it is possible to shape the temporal envelope of a decoded signal in a frequency band encoded with a small number of bits into a desired temporal envelop and thereby improve the quality.

The first decoding unit may include a first decoding/inverse quantization unit configured to perform at least one of decoding and inverse quantization of the first encoded sequence and obtain a first decoded signal, and a first decoding related information output unit configured to output, as first decoding related information, at least one of information obtained in the course of at least one of decoding and inverse quantization in the first decoding/inverse quantization unit and information obtained by analyzing the first encoded sequence. In this configuration, when a decoded signal is generated by being decoded in a plurality of decoding units, it is possible to shape the temporal envelope of a decoded signal in a frequency band encoded with a small number of bits into a desired temporal envelop based at least on information concerning the first decoding unit, and thereby improve the quality.

The second decoding unit may include a second decoding/inverse quantization unit configured to obtain a second decoded signal by using at least one of the second encoded sequence and the first decoded signal, and a second decoding related information output unit configured to output, as second decoding related information, at least one of information obtained in the course of obtaining the second decoded signal in the second decoding/inverse quantization unit and information obtained by analyzing the second encoded sequence. In this configuration, when a decoded signal is generated by being decoded in a plurality of decoding units, it is possible to shape the temporal envelope of a decoded signal in a frequency band encoded with a small number of bits into a desired temporal envelop based at least on information concerning the second decoding unit, and thereby improve the quality.

The selective temporal envelope shaping unit may include a time-frequency transform unit configured to transform the decoded signal into a frequency-domain signal, a frequency selective temporal envelope shaping unit configured to shape a temporal envelope of the frequency-domain decoded signal in each frequency band based on the decoding related information, and a time-frequency inverse transform unit configured to transform the frequency-domain decoded signal where the temporal envelope in each frequency band has been shaped into a time-domain signal. In this configuration, it is possible to shape the temporal envelope of a decoded signal in a frequency band encoded with a small number of bits into a desired temporal envelop in the frequency domain and thereby improve the quality.

The decoding related information may be information concerning the number of encoded bits in each frequency band. In this configuration, it is possible to shape the temporal envelope of a decoded signal in a frequency band into a desired temporal envelop according to the number of encoded bits in each frequency band, and thereby improve the quality.

The decoding related information may be information concerning a quantization step in each frequency band. In this configuration, it is possible to shape the temporal envelope of a decoded signal in a frequency band into a desired temporal envelop according to a quantization step in each frequency band, and thereby improve the quality.

The decoding related information may be information concerning an encoding scheme in each frequency band. In this configuration, it is possible to shape the temporal envelope of a decoded signal in a frequency band into a desired temporal envelop according to an encoding scheme in each frequency band, and thereby improve the quality.

The decoding related information may be information concerning a noise component to be filled to each frequency band. In this configuration, it is possible to shape the temporal envelope of a decoded signal in a frequency band into a desired temporal envelop according to a noise component to be filled to each frequency band, and thereby improve the quality.

The selective temporal envelope shaping unit may shape the decoded signal corresponding to a frequency band where the temporal envelope is to be shaped into a desired temporal envelope with use of a filter using a linear prediction coefficient obtained by linear prediction analysis of the decoded signal in the frequency domain. In this configuration, it is possible to shape the temporal envelope of a decoded signal in a frequency band encoded with a small number of bits into a desired temporal envelop by using a decoded signal in the frequency domain, and thereby improve the quality.

The selective temporal envelope shaping unit may replace the decoded signal corresponding to a frequency band where the temporal envelope is not to be shaped with another signal in a frequency domain, then shape the decoded signal corresponding to a frequency band where the temporal envelope is to be shaped and a frequency band where the temporal envelope is not to be shaped into a desired temporal envelope by filtering the decoded signal corresponding to the frequency band where the temporal envelope is to be shaped and the frequency band where the temporal envelope is not to be shaped with use of a filter using a linear prediction coefficient obtained by linear prediction analysis of the decoded signal in the frequency domain and, after the temporal envelope shaping, set the decoded signal corresponding to the frequency band where the temporal envelope is not to be shaped back to the original signal before replacement with another signal. In this configuration, it is possible to shape the temporal envelope of a decoded signal in a frequency band encoded with a small number of bits into a desired temporal envelop by using a decoded signal in the frequency domain and with less computational complexity, and thereby improve the quality.

An audio decoding device according to one aspect of the present invention is an audio decoding device that decodes an encoded audio signal and outputs the audio signal, including a decoding unit configured to decode an encoded sequence containing the encoded audio signal and obtain a decoded signal, and a temporal envelope shaping unit configured to shape the decoded signal into a desired temporal envelope by filtering the decoded signal in the frequency domain with use of a filter using a linear prediction coefficient obtained by linear prediction analysis of the decoded signal in the frequency domain. In this configuration, it is possible to shape the temporal envelope of a decoded signal in a frequency band encoded with a small number of bits into a desired temporal envelop by using a decoded signal in the frequency domain, and thereby improve the quality.

An audio encoding device according to one aspect of the present invention is an audio encoding device that encodes an input audio signal and outputs an encoded sequence, including an encoding unit configured to encode the audio signal and obtain an encoded sequence containing the audio signal, a temporal envelope information encoding unit configured to encode information concerning a temporal envelope of the audio signal, and a multiplexing unit configured to multiplex the encoded sequence obtained by the encoding unit and an encoded sequence of the information concerning the temporal envelope obtained by the temporal envelope information encoding unit.

Further, one aspect of the present invention can be regarded as an audio decoding method, an audio encoding method, an audio decoding program, and an audio encoding program as described below.

Specifically, an audio decoding method according to one aspect of the present invention is an audio decoding method of an audio decoding device that decodes an encoded audio signal and outputs the audio signal, the method including a decoding step of decoding an encoded sequence containing the encoded audio signal and obtaining a decoded signal, and a selective temporal envelope shaping step of shaping a temporal envelope of a decoded signal in a frequency band based on decoding related information concerning decoding of the encoded sequence.

An audio decoding method according to one aspect of the present invention is an audio decoding method of an audio decoding device that decodes an encoded audio signal and outputs the audio signal, the method including a demultiplexing step of dividing an encoded sequence containing the encoded audio signal and temporal envelope information concerning a temporal envelope of the audio signal, a decoding step of decoding the encoded sequence and obtaining a decoded signal, and a selective temporal envelope shaping step of shaping a temporal envelope of a decoded signal in a frequency band based on at least one of the temporal envelope information and decoding related information concerning decoding of the encoded sequence.

An audio decoding program according to one aspect of the present invention causes a computer to execute a decoding step of decoding an encoded sequence containing an encoded audio signal and obtaining a decoded signal, and a selective temporal envelope shaping step of shaping a temporal envelope of a decoded signal in a frequency band based on decoding related information concerning decoding of the encoded sequence.

An audio decoding method according to one aspect of the present invention is an audio decoding method of an audio decoding device that decodes an encoded audio signal and outputs the audio signal, the method causing a computer to execute a demultiplexing step of dividing an encoded sequence into an encoded sequence containing the encoded audio signal and temporal envelope information concerning a temporal envelope of the audio signal, a decoding step of decoding the encoded sequence and obtaining a decoded signal, and a selective temporal envelope shaping step of shaping a temporal envelope of a decoded signal in a frequency band based on at least one of the temporal envelope information and decoding related information concerning decoding of the encoded sequence.

An audio decoding method according to one aspect of the present invention is an audio decoding method of an audio decoding device that decodes an encoded audio signal and outputs the audio signal, the method including a decoding step of decoding an encoded sequence containing the encoded audio signal and obtaining a decoded signal, and a temporal envelope shaping step of shaping the decoded signal into a desired temporal envelope by filtering the decoded signal in the frequency domain with use of a filter using a linear prediction coefficient obtained by linear prediction analysis of the decoded signal in the frequency domain.

An audio encoding method according to one aspect of the present invention is an audio encoding method of an audio encoding device that encodes an input audio signal and outputs an encoded sequence, the method including an encoding step of encoding the audio signal and obtaining an encoded sequence containing the audio signal, a temporal envelope information encoding step of encoding information concerning a temporal envelope of the audio signal, and a multiplexing step of multiplexing the encoded sequence obtained in the encoding step and an encoded sequence of the information concerning the temporal envelope obtained in the temporal envelope information encoding step.

An audio decoding program according to one aspect of the present invention causes a computer to execute a decoding step of decoding an encoded sequence containing an encoded audio signal and obtaining a decoded signal, and a selective temporal envelope shaping step of shaping a temporal envelope of a decoded signal in a frequency band based on decoding related information concerning decoding of the encoded sequence.

An audio encoding program according to one aspect of the present invention causes a computer to execute an encoding step of encoding the audio signal and obtaining an encoded sequence containing the audio signal, a temporal envelope information encoding step of encoding information concerning a temporal envelope of the audio signal, and a multiplexing step of multiplexing the encoded sequence obtained in the encoding step and an encoded sequence of the information concerning the temporal envelope obtained in the temporal envelope information encoding step.

Advantageous Effects of Invention

According to the present invention, it is possible to shape the temporal envelope of a decoded signal in a frequency band encoded with a small number of bits into a desired temporal envelop and thereby improve the quality.

DETAILED DESCRIPTION OF THE PREFERRED EMBODIMENTS

Figure 1:
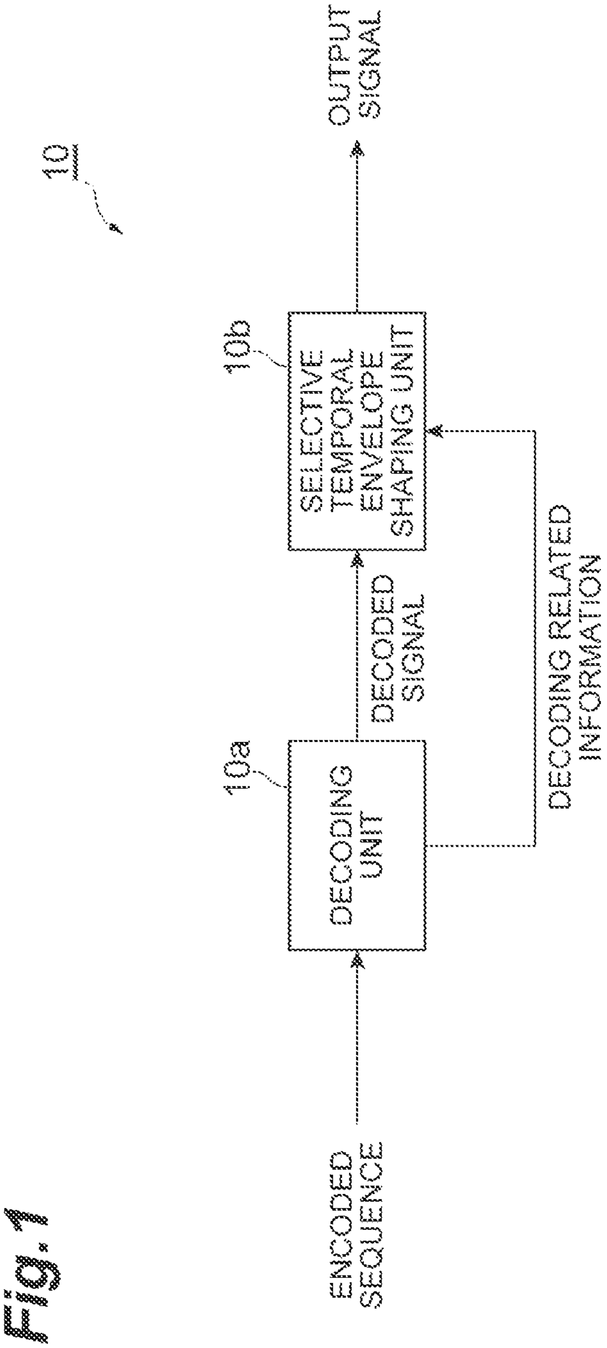
FIG. 1 is a view showing the configuration of an audio decoding device 10 according to a first embodiment.

Embodiments of the present invention are described hereinafter with reference to the attached drawings. Note that, where possible, the same elements are denoted by the same reference numerals and redundant description thereof is omitted.

First Embodiment

FIG. 1 is a view showing the configuration of an audio decoding device 10 according to a first embodiment. A communication device of the audio decoding device 10 receives an encoded sequence of an audio signal and outputs a decoded audio signal to the outside. As shown in FIG. 1, the audio decoding device 10 functionally includes a decoding unit 10*a* and a selective temporal envelope shaping unit 10*b*.

Figure 2:
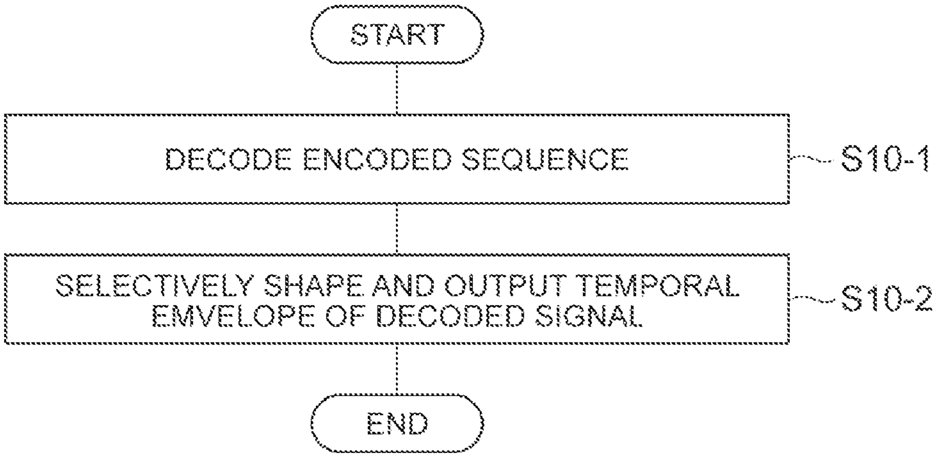
FIG. 2 is a flowchart showing the operation of the audio decoding device 10 according to the first embodiment.

FIG. 2 is a flowchart showing the operation of the audio decoding device 10 according to the first embodiment.

The decoding unit 10*a* decodes an encoded sequence and generates a decoded signal (Step S10-1).

The selective temporal envelope shaping unit 10*b* receives decoding related information, which is information obtained when decoding the encoded sequence, and the decoded signal from the decoding unit, and selectively shapes the temporal envelope of the decoded signal component into a desired temporal envelope (Step S10-2). Note that, in the following description, the temporal envelope of a signal indicates the variation of the energy or power (and a parameter equivalent to those) of the signal in the time direction.

Figure 3:
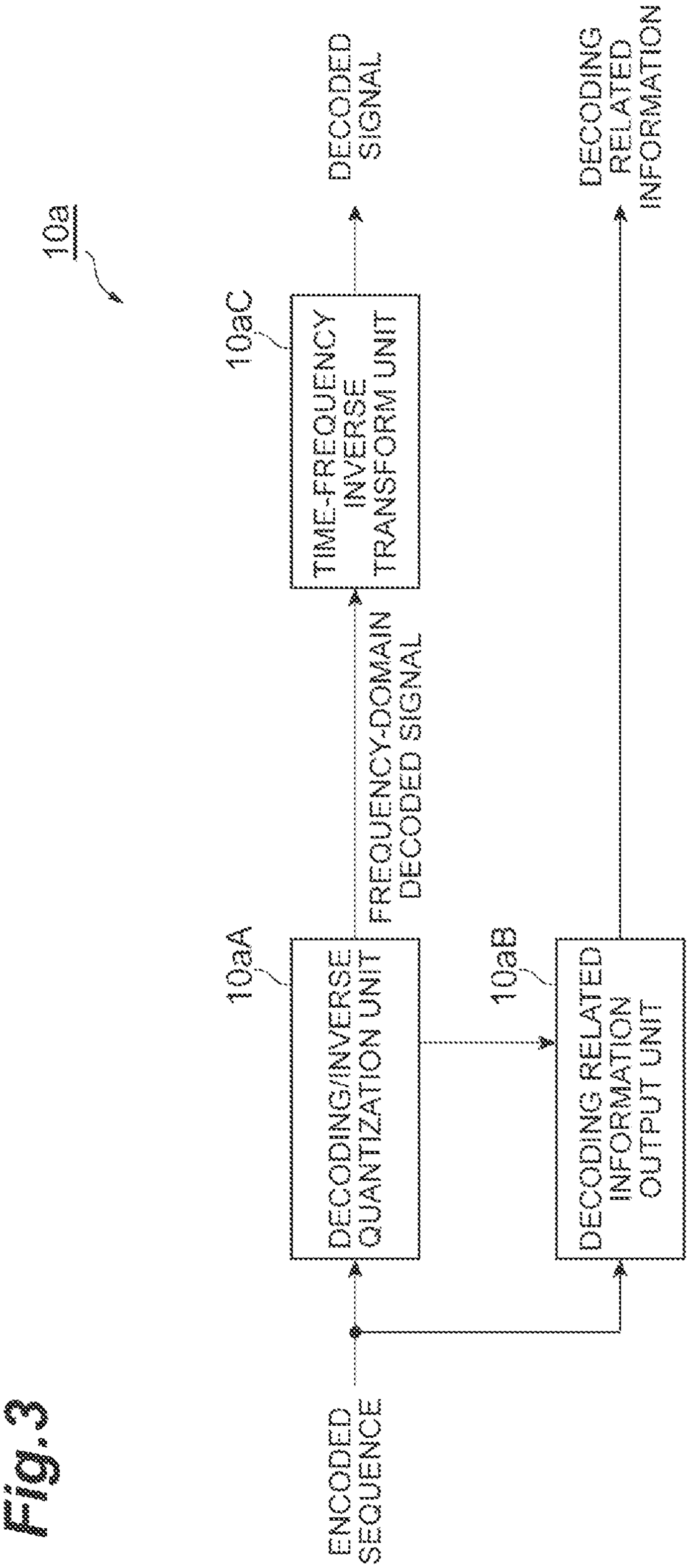
FIG. 3 is a view showing the configuration of a first example of a decoding unit 10*a* in the audio decoding device 10 according to the first embodiment.

FIG. 3 is a view showing the configuration of a first example of the decoding unit 10*a* in the audio decoding device 10 according to the first embodiment. As shown in FIG. 3, the decoding unit 10*a* functionally includes a decoding/inverse quantization unit 10*a*A, a decoding related information output unit 10*a*B, and a time-frequency inverse transform unit 10*a*C.

Figure 4:
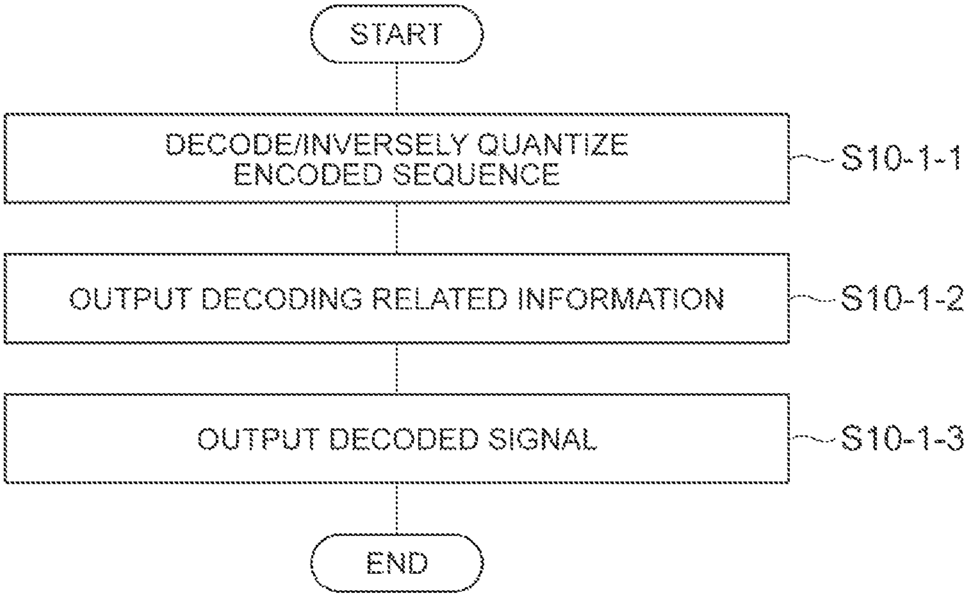
FIG. 4 is a flowchart showing the operation of the first example of the decoding unit 10*a* in the audio decoding device 10 according to the first embodiment.

FIG. 4 is a flowchart showing the operation of the first example of the decoding unit 10*a* in the audio decoding device 10 according to the first embodiment. The decoding/inverse quantization unit 10*a*A performs at least one of decoding and inverse quantization of an encoded sequence in accordance with the encoding scheme of the encoded sequence and thereby generates a decoded signal in the frequency domain (Step S10-1-1).

The decoding related information output unit 10*a*B receives decoding related information, which is information obtained when generating the decoded signal in the decoding/inverse quantization unit 10*a*A, and outputs the decoding related information (Step S10-1-2). The decoding related information output unit 10*a*B may receive an encoded sequence, analyze it to obtain decoding related information, and output the decoding related information. For example, the decoding related information may be the number of encoded bits in each frequency band or equivalent information (for example, the average number of encoded bits per one frequency component in each frequency band). The decoding related information may be the number of encoded bits in each frequency component. The decoding related information may be the quantization step size in each frequency band. The decoding related information may be the quantization value of a frequency component. The frequency component is a transform coefficient of specified time-frequency transform, for example. The decoding related information may be the energy or power in each frequency band. The decoding related information may be information that presents a specified frequency band(s) (or frequency component). Further, when another processing related to temporal envelope shaping is included in the generation of a decoded signal, for example, the decoding related information may be information concerning the temporal envelope shaping processing, such as at least one of information as to whether or not to perform the temporal envelope shaping processing, information concerning a temporal envelope shaped by the temporal envelope shaping processing, and information about the strength of temporal envelope shaping of the temporal envelope shaping processing, for example. At least one of the above examples is output as the decoding related information.

The time-frequency inverse transform unit 10*a*C transforms the decoded signal in the frequency domain into the decoded signal in the time domain by specified time-frequency inverse transform and outputs it (Step S10-1-3). Note that however, the time-frequency inverse transform unit 10*a*C may output the decoded signal in the frequency domain without performing the time-frequency inverse transform. This corresponds to the case where the selective temporal envelope shaping unit 10*b* requests a signal in the frequency domain as an input signal, for example.

Figure 5:
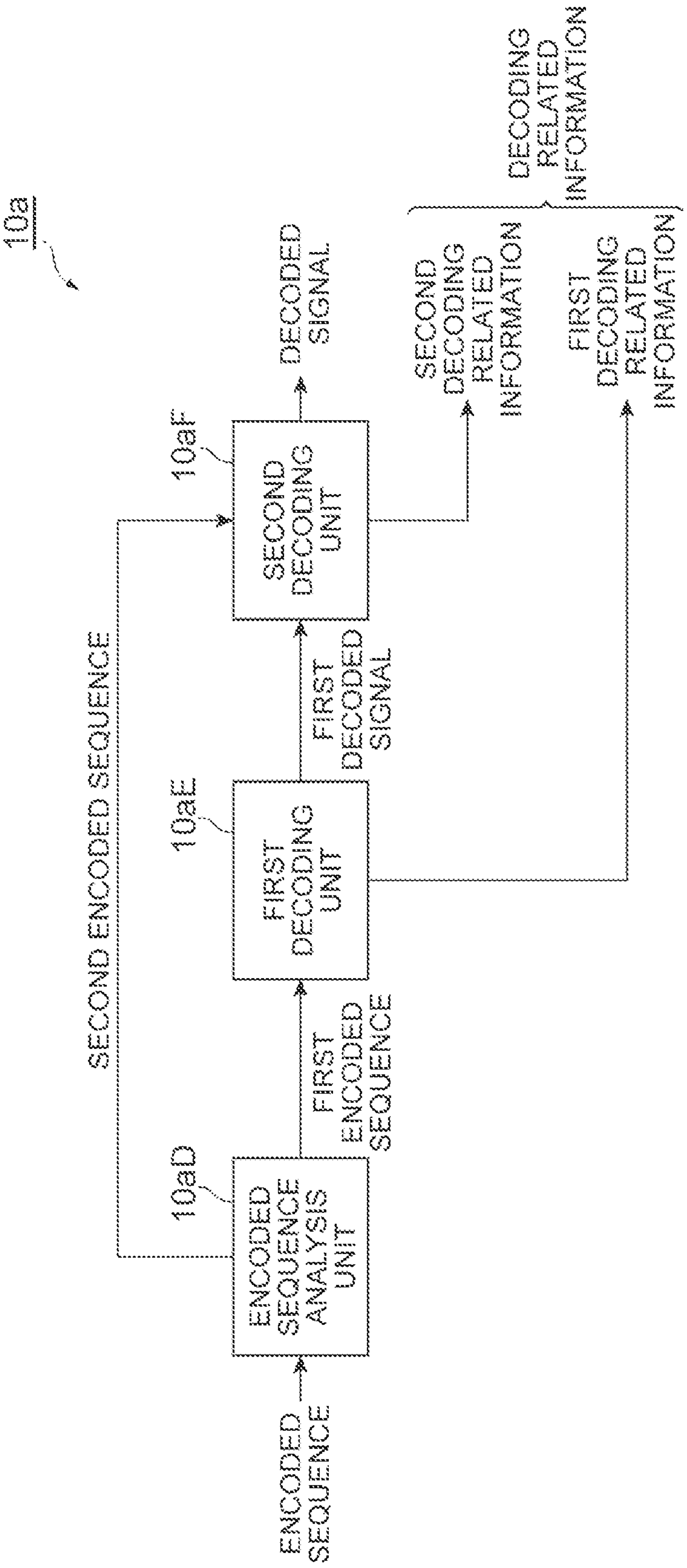
FIG. 5 is a view showing the configuration of a second example of the decoding unit 10*a* in the audio decoding device 10 according to the first embodiment.

FIG. 5 is a view showing the configuration of a second example of the decoding unit 10*a* in the audio decoding device 10 according to the first embodiment. As shown in FIG. 5, the decoding unit 10*a* functionally includes an encoded sequence analysis unit 10*a*D, a first decoding unit 10*a*E, and a second decoding unit 10*a*F.

Figure 6:
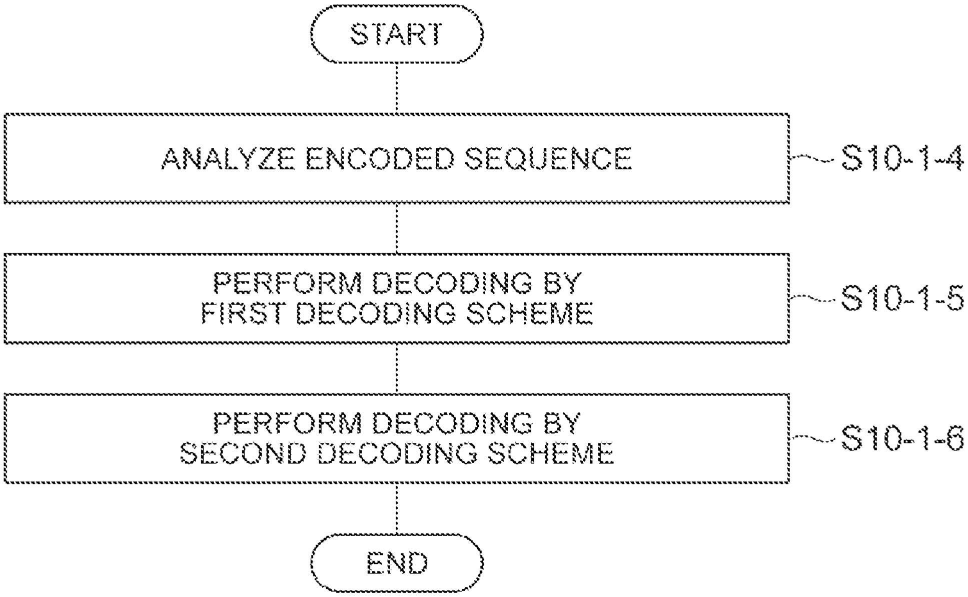
FIG. 6 is a flowchart showing the operation of the second example of the decoding unit 10*a* in the audio decoding device 10 according to the first embodiment.

FIG. 6 is a flowchart showing the operation of the second example of the decoding unit 10*a* in the audio decoding device 10 according to the first embodiment.

The encoded sequence analysis unit 10*a*D analyzes an encoded sequence and divides it into a first encoded sequence and a second encoded sequence (Step S10-1-4).

The first decoding unit 10*a*E decodes the first encoded sequence by a first decoding scheme and generates a first decoded signal, and outputs first decoding related information, which is information concerning this decoding (Step S10-1-5).

The second decoding unit 10*a*F decodes, using the first decoded signal, the second encoded sequence by a second decoding scheme and generates a decoded signal, and outputs second decoding related information, which is information concerning this decoding (Step S10-1-6). In this example, the first decoding related information and the second decoding related information in combination are decoding related information.

Figure 7:
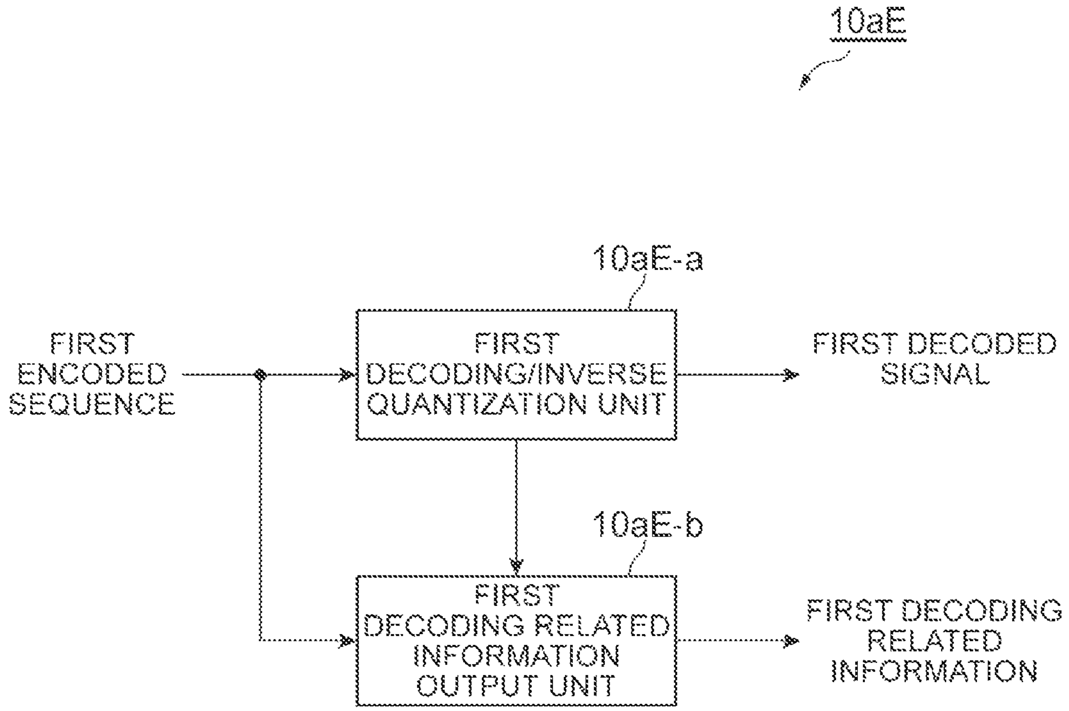
FIG. 7 is a view showing the configuration of a first decoding unit of the second example of the decoding unit 10*a* in the audio decoding device 10 according to the first embodiment.

FIG. 7 is a view showing the configuration of the first decoding unit of the second example of the decoding unit 10*a* in the audio decoding device 10 according to the first embodiment. As shown in FIG. 7, the first decoding unit 10*a*E functionally includes a first decoding/inverse quantization unit 10*a*E-a and a first decoding related information output unit 10*a*E-b.

Figure 8:
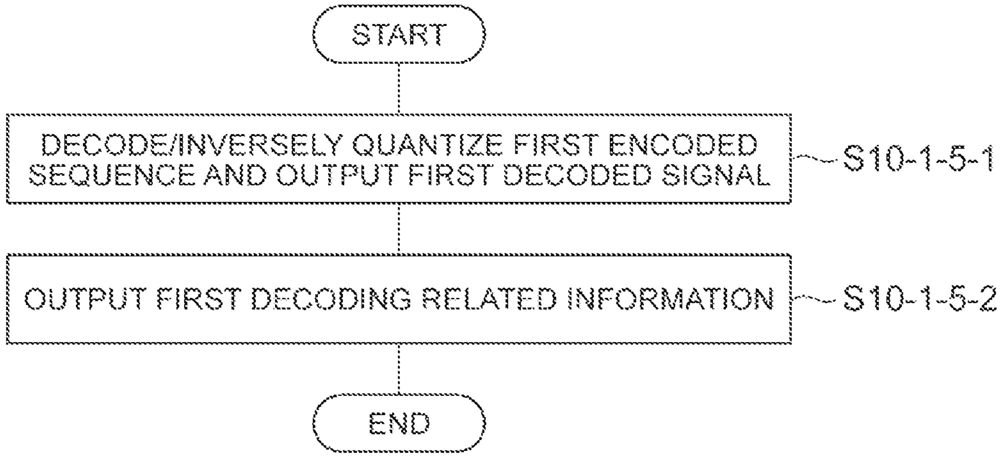
FIG. 8 is a flowchart showing the operation of the first decoding unit of the second example of the decoding unit 10*a* in the audio decoding device 10 according to the first embodiment.

FIG. 8 is a flowchart showing the operation of the first decoding unit of the second example of the decoding unit 10*a* in the audio decoding device 10 according to the first embodiment.

The first decoding/inverse quantization unit 10*a*E-a performs at least one of decoding and inverse quantization of a first encoded sequence in accordance with the encoding scheme of the first encoded sequence and thereby generates and outputs the first decoded signal (Step S10-1-5-1).

The first decoding related information output unit 10*a*E-b receives first decoding related information, which is information obtained when generating the first decoded signal in the first decoding/inverse quantization unit 10*a*E-a, and outputs the first decoding related information (Step S10-5-2). The first decoding related information output unit 10*a*E-b may receive the first encoded sequence, analyze it to obtain the first decoding related information, and output the first decoding related information. Examples of the first decoding related information may be the same as the examples of the decoding related information that is output from the decoding related information output unit 10*a*B. Further, the first decoding related information may be information indicating that the decoding scheme of the first decoding unit is a first decoding scheme. Further, the first decoding related information may be information indicating the frequency band(s) (or frequency component(s)) contained in the first decoded signal (the frequency band(s) (or frequency component(s)) of the audio signal encoded into the first encoded sequence).

Figure 9:
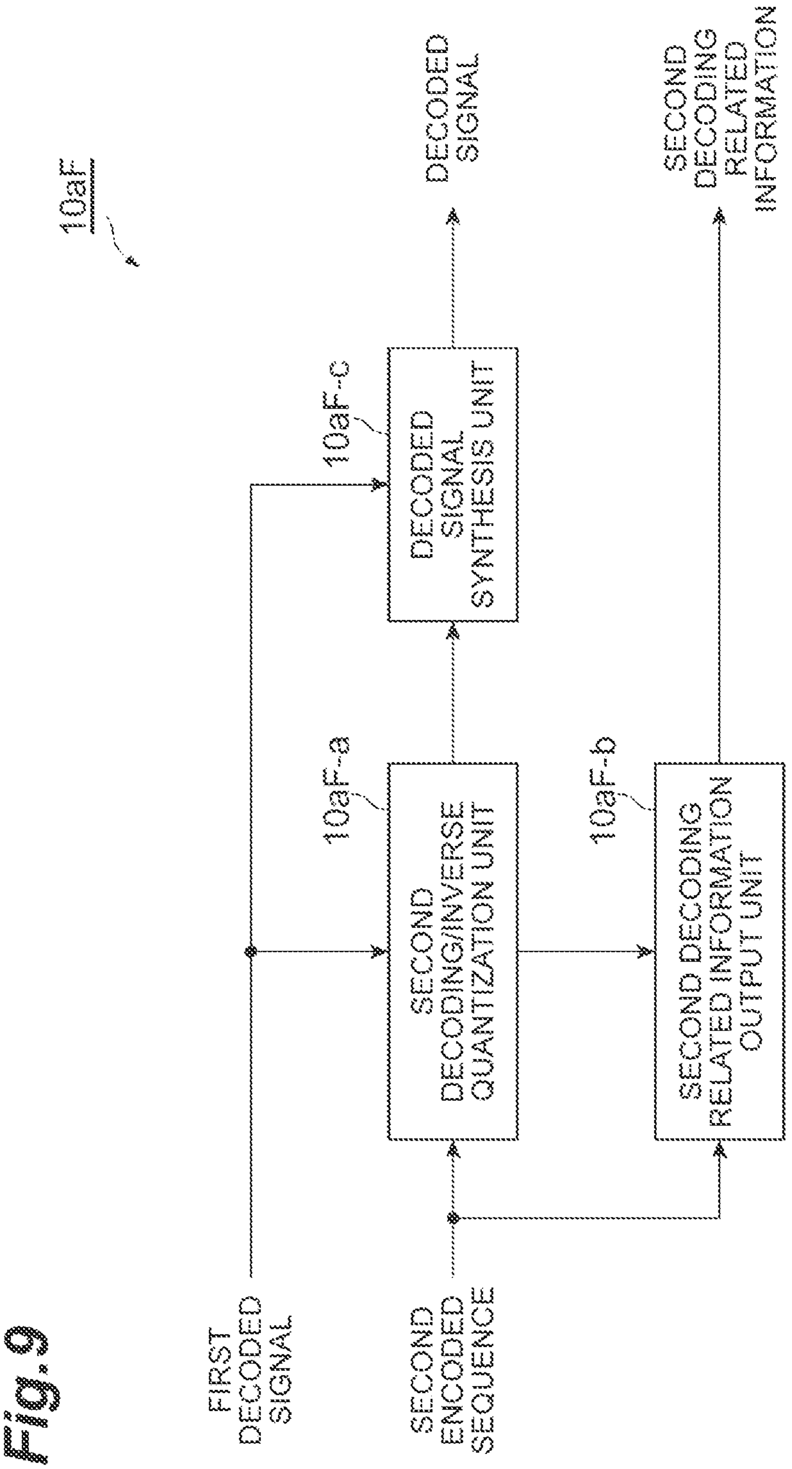
FIG. 9 is a view showing the configuration of a second decoding unit of the second example of the decoding unit 10*a* in the audio decoding device 10 according to the first embodiment.

FIG. 9 is a view showing the configuration of the second decoding unit of the second example of the decoding unit 10*a* in the audio decoding device 10 according to the first embodiment. As shown in FIG. 9, the second decoding unit 10*a*F functionally includes a second decoding/inverse quantization unit 10*a*F-a, a second decoding related information output unit 10*a*F-b, and a decoded signal synthesis unit 10*a*F-c.

Figure 10:
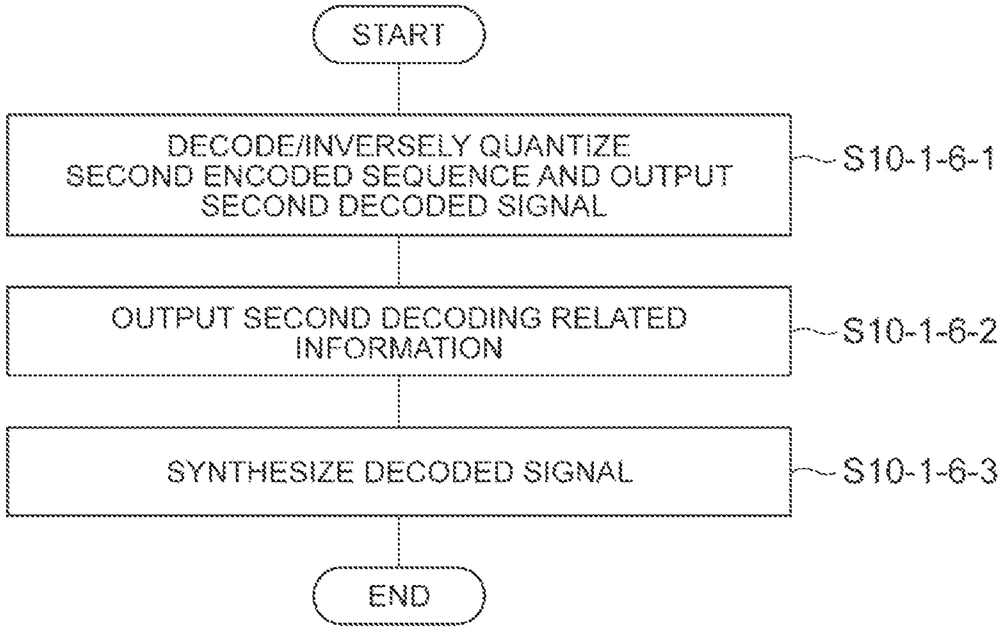
FIG. 10 is a flowchart showing the operation of the second decoding unit of the second example of the decoding unit 10*a* in the audio decoding device 10 according to the first embodiment.

FIG. 10 is a flowchart showing the operation of the second decoding unit of the second example of the decoding unit 10*a* in the audio decoding device 10 according to the first embodiment.

The second decoding/inverse quantization unit 10*a*F-1 performs at least one of decoding and inverse quantization of a second encoded sequence in accordance with the encoding scheme of the second encoded sequence and thereby generates and outputs the second decoded signal (Step S10-1-6-1). The first decoded signal may be used in the generation of the second decoded signal. The decoding scheme (second decoding scheme) of the second decoding unit may be bandwidth extension, and it may be bandwidth extension using the first decoded signal. Further, as described in Patent Literature 1 (Japanese Unexamined Patent Publication No. H9-153811), the second decoding scheme may be a decoding scheme which corresponds to the encoding scheme that makes approximation of a transform coefficient(s) in a frequency band(s) where the number of bits allocated by the first encoding scheme is smaller than a specified threshold to a transform coefficient(s) in another frequency band(s) as the second encoding scheme. Alternatively, as described in Patent Literature 2 (U.S. Pat. No. 7,447,631), the second decoding scheme may be a decoding scheme which corresponds to the encoding scheme that generates a pseudo-noise signal or reproduces a signal with another frequency component by the second encoding scheme for a frequency component that is quantized to zero by the first encoding scheme. The second decoding scheme may be a decoding scheme which corresponds to the encoding scheme that makes approximation of a certain frequency component by using a signal with another frequency component by the second encoding scheme. A frequency component that is quantized to zero by the first encoding scheme can be regarded as a frequency component that is not encoded by the first encoding scheme. In those cases, a decoding scheme corresponding to the first encoding scheme may be a first decoding scheme, which is the decoding scheme of the first decoding unit, and a decoding scheme corresponding to the second encoding scheme may be a second decoding scheme, which is the decoding scheme of the second decoding unit.

The second decoding related information output unit 10*a*F-b receives second decoding related information that is obtained when generating the second decoded signal in the second decoding/inverse quantization unit 10*a*F-a and outputs the second decoding related information (Step S10-1-6-2). Further, the second decoding related information output unit 10*a*F-b may receive the second encoded sequence, analyze it to obtain the second decoding related information, and output the second decoding related information. Examples of the second decoding related information may be the same as the examples of the decoding related information that is output from the decoding related information output unit 10*a*B.

Further, the second decoding related information may be information indicating that the decoding scheme of the second decoding unit is the second decoding scheme. For example, the second decoding related information may be information indicating that the second decoding scheme is bandwidth extension. Further, for example, information indicating a bandwidth extension scheme for each frequency band of the second decoded signal that is generated by bandwidth extension may be used as the second decoding information. The information indicating a bandwidth extension scheme for each frequency band may be information indicating reproduction of a signal using another frequency band(s), approximation of a signal in a certain frequency to a signal in another frequency, generation of a pseudo-noise signal, addition of a sinusoidal signal and the like, for example. Further, in the case of making approximation of a signal in a certain frequency to a signal in another frequency, it may be information indicating an approximation method. Furthermore, in the case of using whitening when approximating a signal in a certain frequency to a signal in another frequency, information concerning the strength of the whitening may be used as the second decoding information. Further, for example, in the case of adding a pseudo-noise signal when approximating a signal in a certain frequency to a signal in another frequency, information concerning the level of the pseudo-noise signal may be used as the second decoding information. Furthermore, for example, in the case of generating a pseudo-noise signal, information concerning the level of the pseudo-noise signal may be used as the second decoding information.

Further, for example, the second decoding related information may be information indicating that the second decoding scheme is a decoding scheme which corresponds to the encoding scheme that performs one or both of approximation of a transform coefficient(s) in a frequency band(s) where the number of bits allocated by the first encoding scheme is smaller than a specified threshold to a transform coefficient(s) in another frequency band(s) and addition (or substitution) of a transform coefficient(s) of a pseudo-noise signal. For example, the second decoding related information may be information concerning the approximation method of a transform coefficient(s) in a certain frequency band(s). For example, in the case of using a method of whitening a transform coefficient(s) in another frequency band(s) as the approximation method, information concerning the strength of the whitening may be used as the second decoding information. Further, information concerning the level of the pseudo-noise signal may be used as the second decoding information.

Further, for example, the second decoding related information may be information indicating that the second encoding scheme is an encoding scheme that generates a pseudo-noise signal or reproduces a signal with another frequency component for a frequency component that is quantized to zero by the first encoding scheme (that is, not encoded by the first encoding scheme). For example, the second decoding related information may be information indicating whether each frequency component is a frequency component that is quantized to zero by the first encoding scheme (that is, not encoded by the first encoding scheme). For example, the second decoding related information may be information indicating whether to generate a pseudo-noise signal or reproduce a signal with another frequency component for a certain frequency component. Further, for example, in the case of reproducing a signal with another frequency component for a certain frequency component, the second decoding related information may be information concerning a reproduction method. The information concerning a reproduction method may be the frequency of a source component of the reproduction, for example. Further, it may be information as to whether or not to perform processing on a source frequency component of the reproduction and information concerning processing to be performed during the reproduction, for example. Further, in the case where the processing to be performed on a source frequency component of the reproduction is whitening, for example, it may be information concerning the strength of the whitening. Furthermore, in the case where the processing to be performed on a source frequency component of the reproduction is addition of a pseudo-noise signal, it may be information concerning the level of the pseudo-noise signal.

The decoded signal synthesis unit 10*a*F-c synthesizes a decoded signal from the first decoded signal and the second decoded signal and outputs it (Step S10-1-6-3). In the case where the second encoding scheme is bandwidth extension, the first decoded signal is a signal in a low frequency band(s) and the second decoded signal is a signal in a high frequency band(s) in general, and the decoded signal has the both frequency bands.

Figure 11:
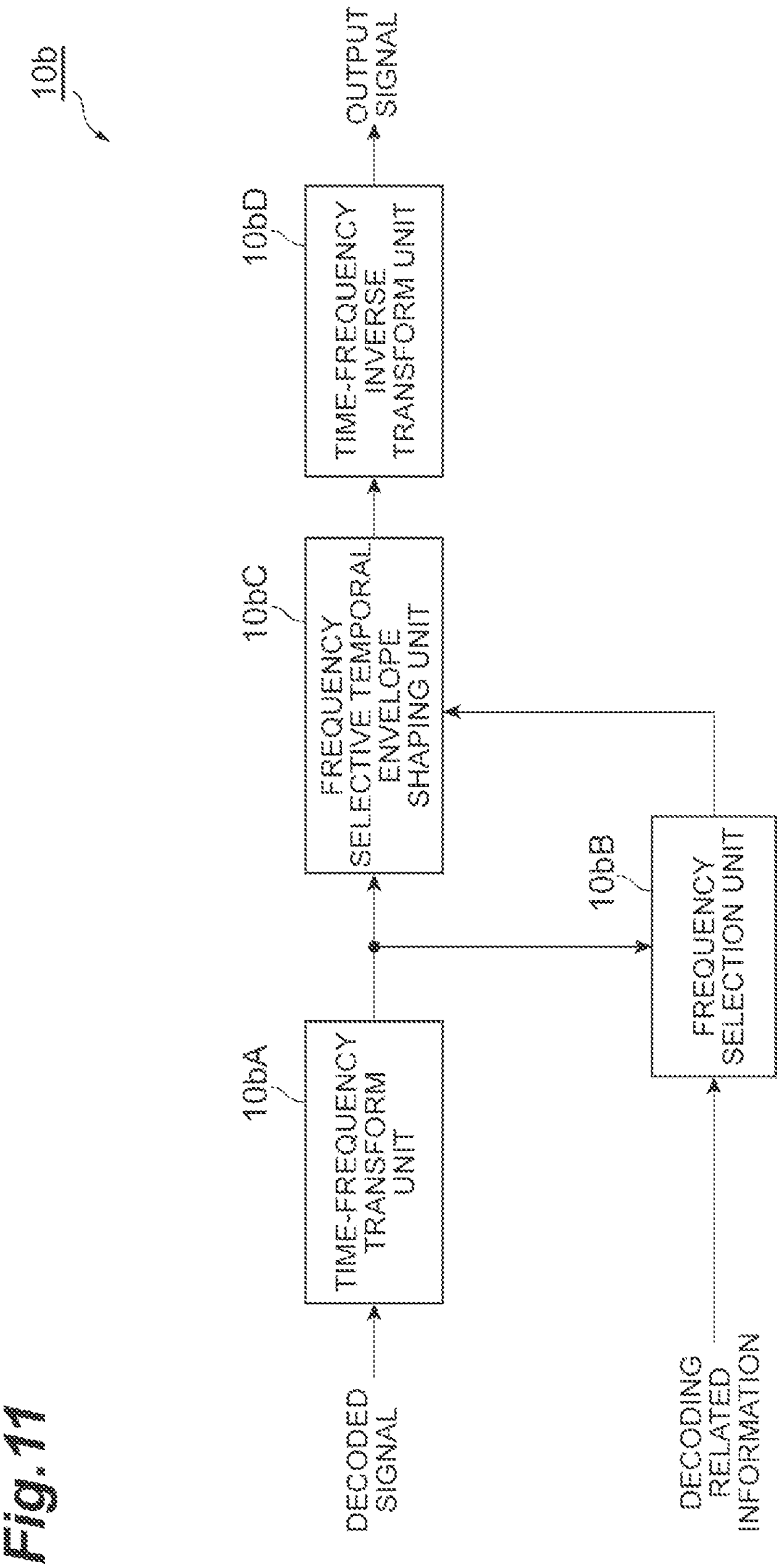
FIG. 11 is a view showing the configuration of a first example of a selective temporal envelope shaping unit 10*b* in the audio decoding device 10 according to the first embodiment.

FIG. 11 is a view showing the configuration of a first example of the selective temporal envelope shaping unit 10*b* in the audio decoding device 10 according to the first embodiment. As shown in FIG. 11, the selective temporal envelope shaping unit 10*b* functionally includes a time-frequency transform unit 10*b*A, a frequency selection unit 10*b*B, a frequency selective temporal envelope shaping unit 10*b*C, and a time-frequency inverse transform unit 10*b*D.

Figure 12:
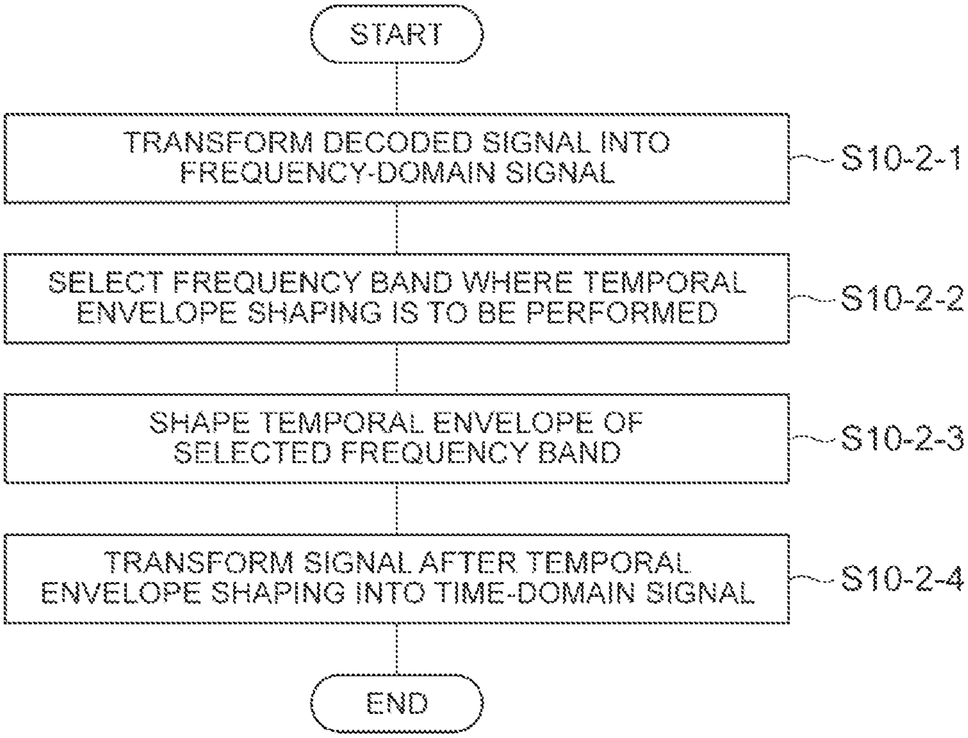
FIG. 12 is a flowchart showing the operation of the first example of the selective temporal envelope shaping unit 10*b* in the audio decoding device 10 according to the first embodiment.

FIG. 12 is a flowchart showing the operation of the first example of the selective temporal envelope shaping unit 10*b* in the audio decoding device 10 according to the first embodiment.

The time-frequency transform unit 10*b*A transforms a decoded signal in the time domain into a decoded signal in the frequency domain by specified time-frequency transform (Step S10-2-1). Note that however, when the decoded signal is a signal in the frequency domain, the time-frequency transform unit 10*b*A and Step S10-2-1 can be omitted.

The frequency selection unit 10*b*B selects a frequency band(s) of the frequency-domain decoded signal where temporal envelope shaping is to be performed by using at least one of the frequency-domain decoded signal and the decoding related information (Step S10-2-2). In this frequency selection step, a frequency component where temporal envelope shaping is to be performed may be selected. The frequency band(s) (or frequency component(s)) to be selected may be a part of or the whole of the frequency band(s) (or frequency component(s)) of the decoded signal.

For example, in the case where the decoding related information is the number of encoded bits in each frequency band, a frequency band(s) where the number of encoded bits is smaller than a specified threshold may be selected as the frequency band(s) where temporal envelope shaping is to be performed. Likewise, in the case where the decoding related information is equivalent information to the number of encoded bits in each frequency band, the frequency band(s) where temporal envelope shaping is to be performed can be selected by comparison with a specified threshold as a matter of course. Further, in the case where the decoding related information is the number of encoded bits in each frequency component, for example, a frequency component where the number of encoded bits is smaller than a specified threshold may be selected as the frequency component where temporal envelope shaping is to be performed. For example, a frequency component where a transform coefficient(s) is not encoded may be selected as the frequency component where temporal envelope shaping is to be performed. Further, for example, in the case where the decoding related information is the quantization step size in each frequency band, a frequency band(s) where the quantization step size is larger than a specified threshold may be selected as the frequency band(s) where temporal envelope shaping is to be performed. Further, in the case where the decoding related information is the quantization value of a frequency component, for example, the frequency band(s) where temporal envelope shaping is to be performed may be selected by comparing the quantization value with a specified threshold. For example, a component where a quantization transform coefficient(s) is smaller than a specified threshold may be selected as the frequency component where temporal envelope shaping is to be performed. Further, in the case where the decoding related information is the energy or power in each frequency band, for example, the frequency band(s) where temporal envelope shaping is to be performed may be selected by comparing the energy or power with a specified threshold. For example, when the energy or power in a frequency band(s) where selective temporal envelope shaping is to be performed is smaller than a specified threshold, it can be determined that temporal envelope shaping is not performed in this frequency band(s).

Further, in the case where the decoding related information is information concerning another temporal envelope shaping processing, a frequency band(s) where this temporal envelope shaping processing is not to be performed may be selected as the frequency band(s) where temporal envelope shaping according to the present invention is to be performed.

Further, in the case where the decoding unit 10*a* has the configuration described as the second example of the decoding unit 10*a* and the decoding related information is the encoding scheme of the second decoding unit, a frequency band(s) to be decoded by the second decoding unit by a scheme corresponding to the encoding scheme of the second decoding unit may be selected as the frequency band(s) where temporal envelope shaping is to be performed. For example, when the encoding scheme of the second decoding unit is bandwidth extension, a frequency band(s) to be decoded by the second decoding unit may be selected as the frequency band(s) where temporal envelope shaping is to be performed. Further, for example, when the encoding scheme of the second decoding unit is bandwidth extension in the time domain, a frequency band(s) to be decoded by the second decoding unit may be selected as the frequency band(s) where temporal envelope shaping is to be performed. For example, when the encoding scheme of the second decoding unit is bandwidth extension in the frequency domain, a frequency band(s) to be decoded by the second decoding unit may be selected as the frequency band(s) where temporal envelope shaping is to be performed. For example, a frequency band(s) where a signal is reproduced with another frequency band(s) by bandwidth extension may be selected as the frequency band(s) where temporal envelope shaping is to be performed. For example, a frequency band(s) where a signal is approximated by using a signal in another frequency band(s) by bandwidth extension may be selected as the frequency band(s) where temporal envelope shaping is to be performed. For example, a frequency band(s) where a pseudo-noise signal is generated by bandwidth extension may be selected as the frequency band(s) where temporal envelope shaping is to be performed. For example, a frequency band(s) excluding a frequency band(s) where a sinusoidal signal is added by bandwidth extension may be selected as the frequency band(s) where temporal envelope shaping is to be performed.

Further, in the case where the decoding unit 10*a* has the configuration described as the second example of the decoding unit 10*a*, and the second encoding scheme is an encoding scheme that performs one or both of approximation of a transform coefficient(s) of a frequency band(s) or component(s) where the number of bits allocated by the first encoding scheme is smaller than a specified threshold (or a frequency band(s) or component(s) that is not encoded by the first encoding scheme) to a transform coefficient(s) in another frequency band(s) or component(s) and addition (or substitution) of a transform coefficient(s) of a pseudo-noise signal, a frequency band(s) or component where approximation of a transform coefficient(s) to a transform coefficient(s) in another frequency band(s) or component(s) is made may be selected as the frequency band(s) or component(s) where temporal envelope shaping is to be performed. For example, a frequency band(s) or component(s) where a transform coefficient(s) of a pseudo-noise signal is added or substituted may be selected as the frequency band(s) or component(s) where temporal envelope shaping is to be performed. For example, a frequency band(s) or component(s) may be selected as the frequency band(s) or component(s) where temporal envelope shaping is to be performed in accordance with an approximation method when approximating a transform coefficient(s) by using a transform coefficient(s) in another frequency band(s) or component(s). For example, in the case of using a method of whitening a transform coefficient(s) in another frequency band(s) or component(s) as the approximation method, the frequency band(s) or component(s) where temporal envelope shaping is to be performed may be selected according to the strength of the whitening. For example, in the case of adding (or substituting) a transform coefficient(s) of a pseudo-noise signal, the frequency band(s) or component(s) where temporal envelope shaping is to be performed may be selected according to the level of the pseudo-noise signal.

Furthermore, in the case where the decoding unit 10*a* has the configuration described as the second example of the decoding unit 10*a*, and the second encoding scheme is an encoding scheme that generates a pseudo-noise signal or reproduces a signal in another frequency component (or makes approximation using a signal in another frequency component) for a frequency component that is quantized to zero by the first encoding scheme (that is, not encoded by the first encoding scheme), a frequency component where a pseudo-noise signal is generated may be selected as the frequency component where temporal envelope shaping is to be performed. For example, a frequency component where reproduction of a signal in another frequency component (or approximation using a signal in another frequency component) is done may be selected as the frequency component where temporal envelope shaping is to be performed. For example, in the case of reproducing a signal in another frequency component (or making approximation using a signal in another frequency component) for a certain frequency component, the frequency component where temporal envelope shaping is to be performed may be selected according to the frequency of a source component of the reproduction (or approximation). For example, the frequency component where temporal envelope shaping is to be performed may be selected according to whether or not to perform processing on a source frequency component of the reproduction during the reproduction. Further, for example, the frequency component where temporal envelope shaping is to be performed may be selected according to processing to be performed on a source frequency component of the reproduction (or approximation) during the reproduction (or approximation). For example, in the case where the processing to be performed on a source frequency component of the reproduction (or approximation) is whitening, the frequency component where temporal envelope shaping is to be performed may be selected according to the strength of the whitening. Further, for example, the frequency component where temporal envelope shaping is to be performed may be selected according to a method of approximation.

A method of selecting a frequency component or a frequency band(s) may be a combination of the above-described examples. Further, the frequency component(s) or band(s) of a frequency-domain decoded signal where temporal envelope shaping is to be performed may be selected by using at least one of the frequency-domain decoded signal and the decoding related information, and a method of selecting a frequency component or a frequency band(s) is not limited to the above examples.

The frequency selective temporal envelope shaping unit **10*b*C shapes the temporal envelope of the frequency band(s) of the decoded signal which is selected by the frequency selection unit 10*b*B into a desired temporal envelope (Step S10-2-3**). The temporal envelope shaping may be done for each frequency component.

As a method for temporal envelope shaping, the temporal envelope may be made flat by filtering with a linear prediction inverse filter using a linear prediction coefficient(s) obtained by linear prediction analysis of a transform coefficient(s) of a selected frequency band(s), for example. A transfer function A(z) of the linear prediction inverse filter is a function that represents a response of the linear prediction inverse filter in a discrete-time system, which is represented by the following equation:

$$A(z) = 1 + \sum_{i=1}^{p} a_i z^{-i} \tag{1}$$

where p is a prediction order and $\alpha i(i=1, \ldots, p)$ is a linear prediction coefficient. For example, a method of making the temporal envelope rising or falling by filtering a transform coefficient(s) of a selected frequency band(s) with a linear prediction filter using the linear prediction coefficient(s) may be used. A transfer function of the linear prediction filter is represented by the following equation:

$$\frac{1}{A(z)} = \frac{1}{1 + \sum_{i=1}^{p} a_i z^{-i}} \tag{2}$$

In the temporal envelope shaping using the linear prediction coefficient(s), the strength of making the temporal envelope flat, or rising or falling may be adjusted using a bandwidth expansion ratio ρ as the following equations.

$$A(z) = 1 + \sum_{i=1}^{p} a_i \rho^i z^{-i} \tag{3}$$

$$\frac{1}{A(z)} = \frac{1}{1 + \sum_{i=1}^{p} a_i \rho^i z^{-i}} \tag{4}$$

The above-described example may be performed on a sub-sample at arbitrary time t of a sub-band signal that is obtained by transforming a decoded signal into a frequency-domain signal by a filter bank, not only on a transform coefficient(s) that is obtained by time-frequency transform of the decoded signal. In the above example, by filtering a decoded signal in the frequency domain on the basis of linear prediction analysis, the distribution of the power of the decoded signal in the time domain is changed to thereby shape the temporal envelope.

Further, for example, the temporal envelope may be flattened by converting the amplitude of a sub-band signal obtained by transforming a decoded signal into a frequency-domain signal by a filter bank into the average amplitude of a frequency component(s) (or frequency band(s)) where temporal envelope shaping is to be performed in an arbitrary time segment. It is thereby possible to make the temporal envelope flat while maintaining the energy of the frequency component(s) (or frequency band(s)) of the time segment before temporal envelope shaping. Likewise, the temporal envelope may be made rising or falling by changing the amplitude of a sub-band signal while maintaining the energy of the frequency component(s) (or frequency band(s)) of the time segment before temporal envelope shaping.

Figure 13:
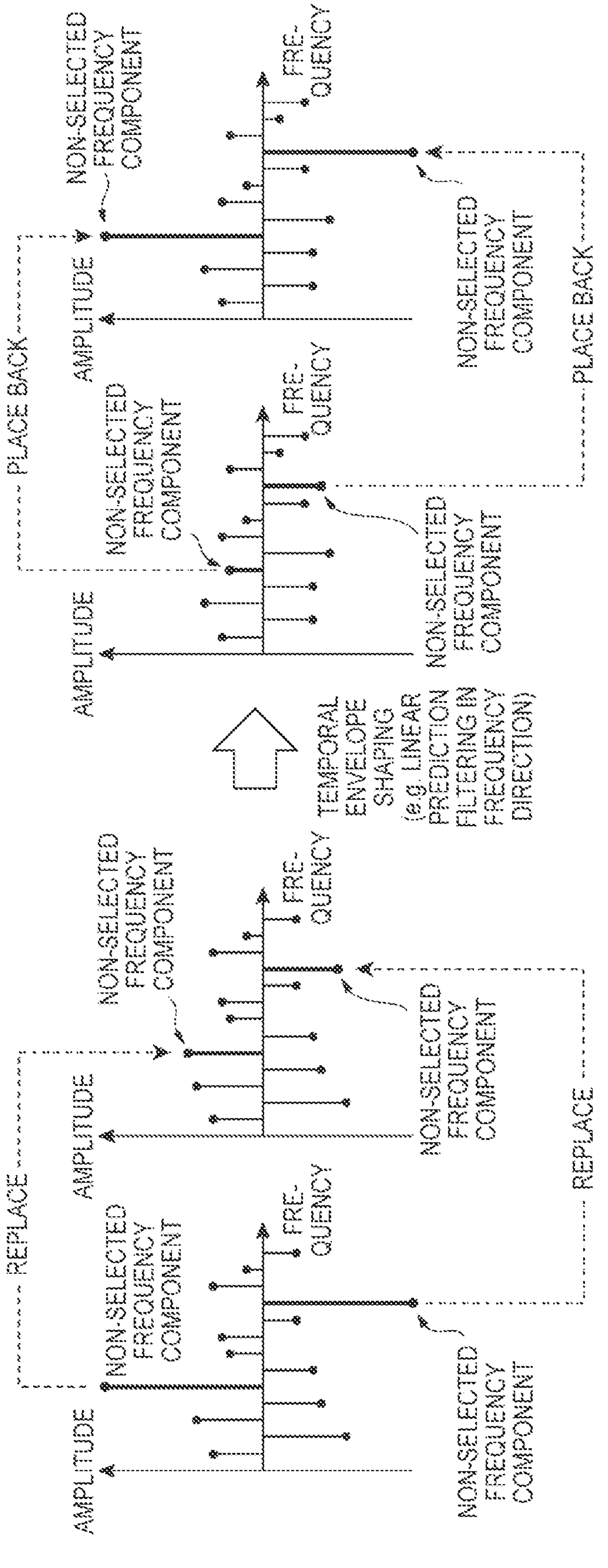
FIG. 13 is an explanatory view showing temporal envelope shaping.

Further, for example, as shown in FIG. 13, in a frequency band(s) that contains a frequency component(s) or frequency band(s) that is not selected as the frequency component(s) or frequency band(s) where temporal envelope shaping is to be performed by the frequency selection unit **10*b*B** (which is referred to as a non-selected frequency component(s) or non-selected frequency band(s)), temporal envelope shaping may be performed by the above-described temporal envelope shaping method after replacing a transform coefficient(s) (or sub-sample(s)) of the non-selected frequency component(s) (or non-selected frequency band(s)) of a decoded signal with another value, and then the transform coefficient(s) (or sub-sample(s)) of the non-selected frequency component(s) (or non-selected frequency band(s)) may be set back to the original value before the replacement, thereby performing temporal envelope shaping on the frequency component(s) (or frequency band(s)) excluding the non-selected frequency component(s) (or non-selected frequency band(s)).

In this way, even when the frequency component(s) (or frequency band(s)) where temporal envelope shaping is to be performed is divided into many small segments due to scattered non-selected frequency components (or non-selected frequency bands), it is possible to perform temporal envelope shaping of the frequency component(s) (or frequency band(s)) segments all together, thereby achieving reduction of computational complexity. For example, in the above-described temporal envelope shaping method using the linear prediction analysis, while it is required to perform the linear prediction analysis for each of the frequency component(s) (or frequency band(s)) segments where temporal envelope shaping is to be performed without this technique, it is only necessary to perform the linear prediction analysis once for the frequency component(s) (or frequency band(s)) segments including non-selected frequency components (or non-selected frequency bands), and further it is only necessary to perform filtering with the linear prediction inverse filter (or linear prediction filter) of the frequency component(s) (or frequency band(s)) segments including non-selected frequency components (or non-selected frequency bands) all at once, thereby achieving reduction of computational complexity.

In the replacement of a transform coefficient(s) (or sub-sample(s)) of the non-selected frequency component(s) (or non-selected frequency band(s)), the amplitude of a transform coefficient(s) (or sub-sample(s)) of the non-selected frequency component(s) (or non-selected frequency band(s)) may be replaced with the average value of the amplitude including the transform coefficient(s) (or sub-sample(s)) of the non-selected frequency component(s) (or non-selected frequency band(s)) and the adjacent frequency component(s) (or frequency band(s)). As this time, the sign of the transform coefficient(s) may be the same as the sign of the original transform coefficient(s), and the phase of the sub-sample may be the same as the phase of the original sub-sample. Furthermore, in the case where the transform coefficient(s) (or sub-sample(s)) of the frequency component(s) (or frequency band(s)) is not quantized/encoded, and it is selected to perform temporal envelope shaping on a frequency component(s) (or frequency band(s)) that is generated by reproduction or approximation using the transform coefficient(s) (or sub-sample(s)) of another frequency component(s) (or frequency band(s)), or/and generation or addition of a pseudo-noise signal, and/or addition of a sinusoidal signal, the transform coefficient(s) (or sub-sample(s)) of the non-selected frequency component(s) (or non-selected frequency band(s)) may be replaced with a transform coefficient(s) (or sub-sample(s)) that is generated by reproduction or approximation using the transform coefficient(s) (or sub-sample(s)) of another frequency component(s) (or frequency band(s)), or/and generation or addition of a pseudo-noise signal, and/or addition of a sinusoidal signal in a pseudo manner. A temporal envelope shaping method of the selected frequency band(s) may be a combination of the above-described methods, and the temporal envelope shaping method is not limited to the above examples.

The time-frequency inverse transform unit 10*b*D transforms the decoded signal where temporal envelope shaping has been performed in a frequency selective manner into the signal in the time domain and outputs it (Step S10-2-4).

Second Embodiment

Figure 14:
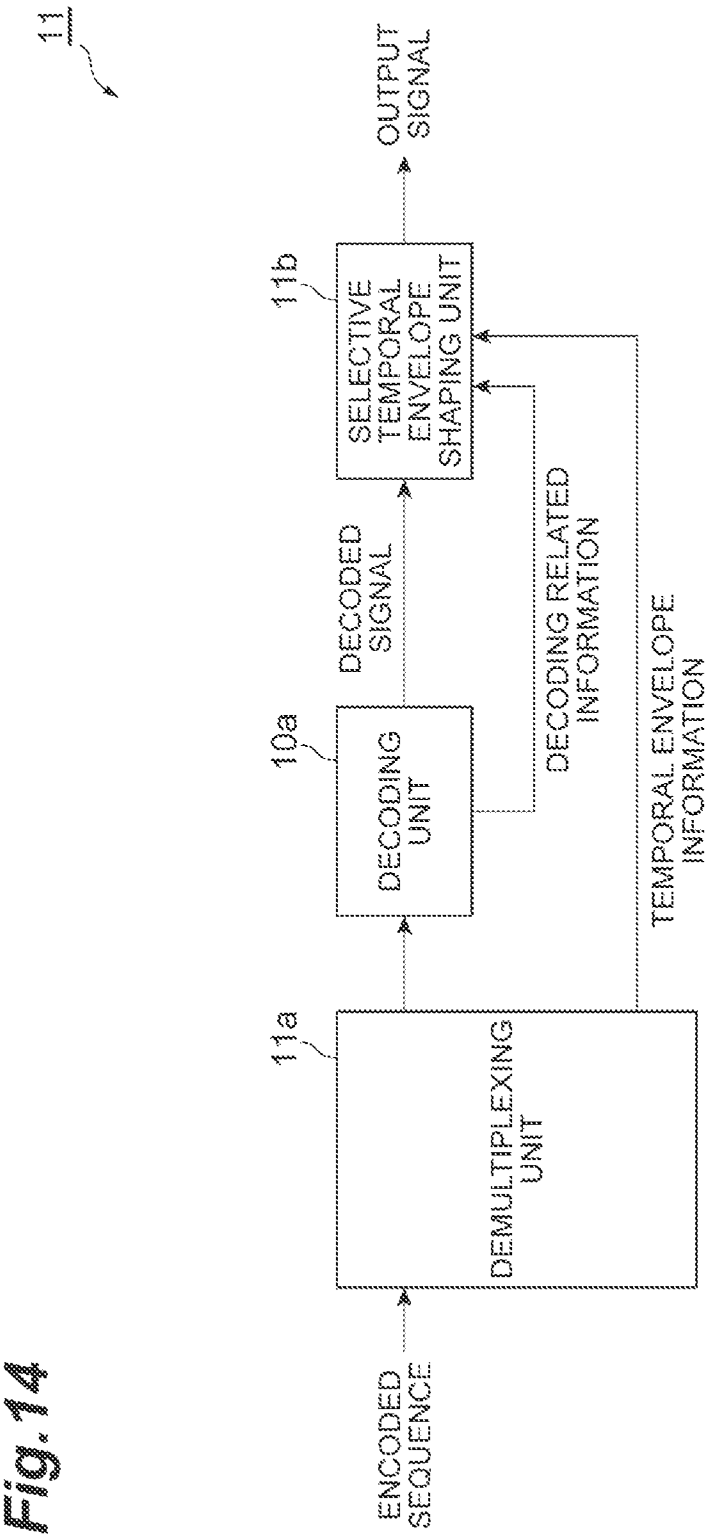
FIG. 14 is a view showing the configuration of an audio decoding device 11 according to a second embodiment.

FIG. 14 is a view showing the configuration of an audio decoding device 11 according to a second embodiment. A communication device of the audio decoding device 11 receives an encoded sequence of an audio signal and outputs a decoded audio signal to the outside. As shown in FIG. 14, the audio decoding device 11 functionally includes a demultiplexing unit 11*a*, a decoding unit 10*a*, and a selective temporal envelope shaping unit 11*b*.

Figure 15:
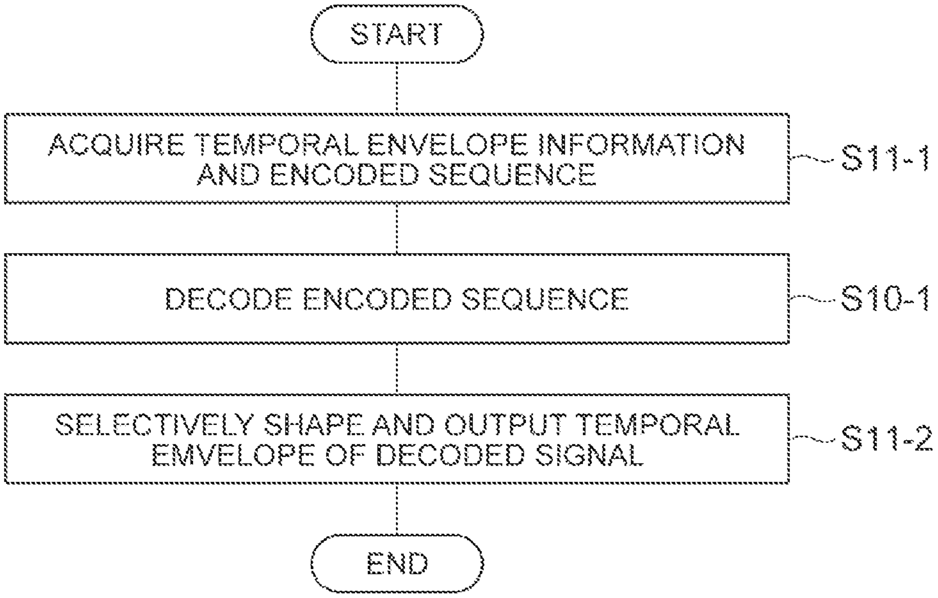
FIG. 15 is a flowchart showing the operation of the audio decoding device 11 according to the second embodiment.

FIG. 15 is a flowchart showing the operation of the audio decoding device 11 according to the second embodiment.

The demultiplexing unit 11*a* divides an encoded sequence into the encoded sequence to obtain a decoded signal and temporal envelope information by decoding/inverse quantization (Step S11-1). The decoding unit 10*a* decodes the encoded sequence and thereby generates a decoded signal (Step S10-1). When the temporal envelope information is encoded or/and quantized, it is decoded or/and inversely quantized to obtain the temporal envelope information.

The temporal envelope information may be information indicating that the temporal envelope of an input signal that has been encoded by an encoding device is flat, for example. For example, it may be information indicating that the temporal envelope of the input signal is rising. For example, it may be information indicating that the temporal envelope of the input signal is falling.

Further, for example, the temporal envelope information may be information indicating the degree of flatness of the temporal envelope of the input signal, information indicating the degree of rising of the temporal envelope of the input signal, or information indicating the degree of falling of the temporal envelope of the input signal, for example.

Further, for example, the temporal envelope information may be information indicating whether or not to shape the temporal envelope by the selective temporal envelope shaping unit.

The selective temporal envelope shaping unit 11*b* receives decoding related information, which is information obtained when decoding the encoded sequence, and the decoded signal from the decoding unit 10*a*, receives the temporal envelope information from the demultiplexing unit, and selectively shapes the temporal envelope of the decoded signal component into a desired temporal envelope based on at least one of them (Step S11-2).

A method of the selective temporal envelope shaping in the selective temporal envelope shaping unit 11*b* may be the same as the one in the selective temporal envelope shaping unit 10*b*, or the selective temporal envelope shaping may be performed by taking the temporal envelope information into consideration as well, for example. For example, in the case where the temporal envelope information is information indicating that the temporal envelope of an input signal that has been encoded by an encoding device is flat, the temporal envelope may be shaped to be flat based on this information. In the case where the temporal envelope information is information indicating that the temporal envelope of the input signal is rising, for example, the temporal envelope may be shaped to rise based on this information. In the case where the temporal envelope information is information indicating that the temporal envelope of the input signal is falling, for example, the temporal envelope may be shaped to fall based on this information.

Further, for example, in the case where the temporal envelope information is information indicating the degree of flatness of the temporal envelope of the input signal, the degree of making the temporal envelope flat may be adjusted based on this information. In the case where the temporal envelope information is information indicating the degree of rising of the temporal envelope of the input signal, for example, the degree of making the temporal envelope rising may be adjusted based on this information. In the case where the temporal envelope information is information indicating the degree of falling of the temporal envelope of the input signal, for example, the degree of making the temporal envelope falling may be adjusted based on this information.

Further, for example, in the case where the temporal envelope information is information indicating whether or not to shape the temporal envelope by the selective temporal envelope shaping unit 11*b*, whether or not to perform temporal envelope shaping may be determined based on this information.

Further, for example, in the case of performing temporal envelope shaping based on the temporal envelope information of the above-described examples, a frequency component (or frequency band) where temporal envelope shaping is to be performed may be selected in the same way as in the first embodiment, and the temporal envelope of the selected frequency component(s) (or frequency band(s)) of the decoded signal may be shaped into a desired temporal envelope.

Figure 16:
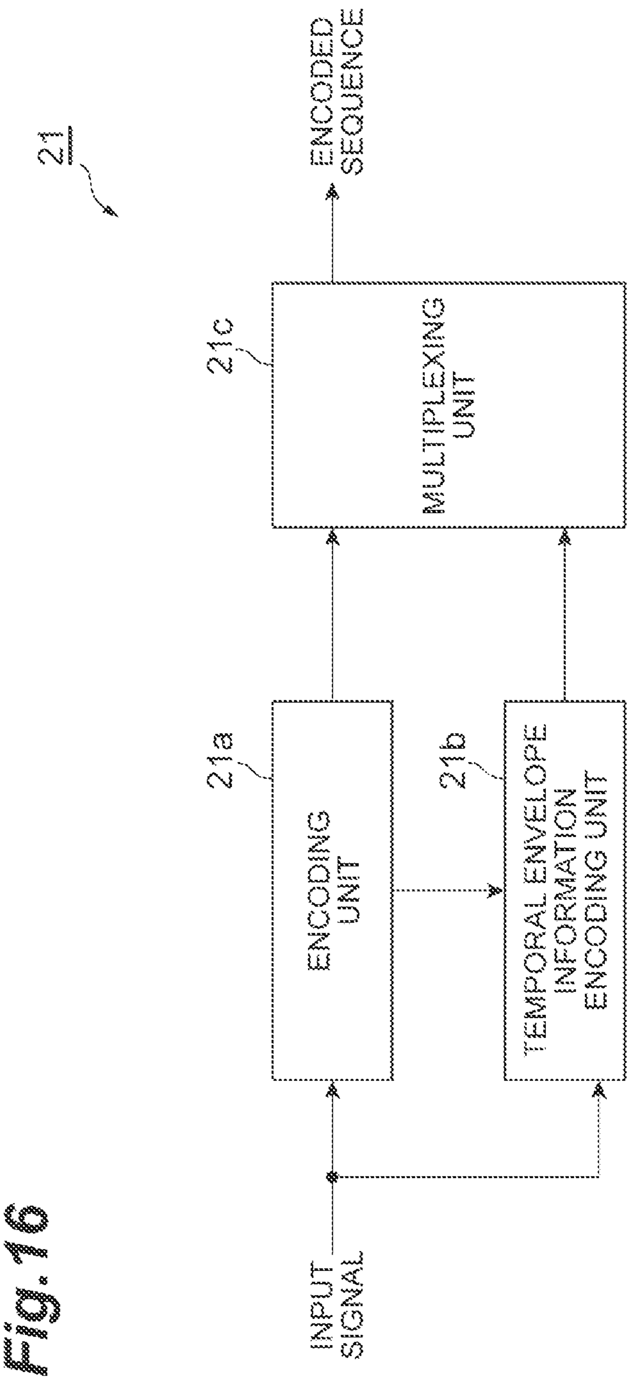
FIG. 16 is a view showing the configuration of an audio encoding device 21 according to the second embodiment.

FIG. 16 is a view showing the configuration of an audio encoding device 21 according to the second embodiment. A communication device of the audio encoding device 21 receives an audio signal to be encoded from the outside, and outputs an encoded sequence to the outside. As shown in FIG. 16, the audio encoding device 21 functionally includes an encoding unit 21*a*, a temporal envelope information encoding unit 21*b*, and a multiplexing unit 21*c*.

Figure 17:
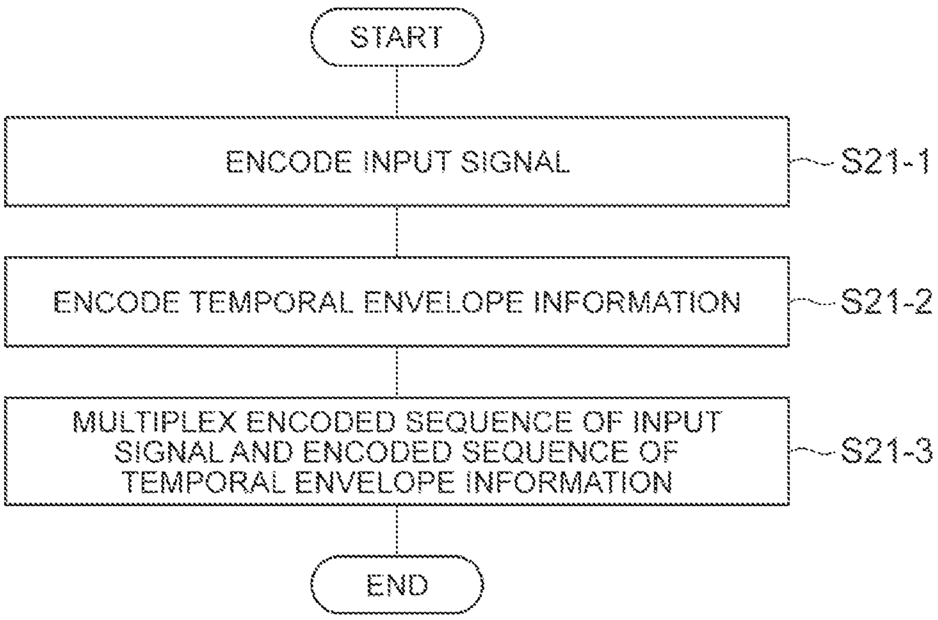
FIG. 17 is a flowchart showing the operation of the audio encoding device 21 according to the second embodiment.

FIG. 17 is a flowchart showing the operation of the audio encoding device 21 according to the second embodiment.

The encoding unit 21*a* encodes an input audio signal and generates an encoded sequence (Step S21-1). The encoding scheme of the audio signal in the encoding unit 21*a* is an encoding scheme corresponding to the decoding scheme of the decoding unit 10*a* described above.

The temporal envelope information encoding unit 21*b* generates temporal envelope information with use of the input audio signal and at least one of information obtained when encoding the audio signal in the encoding unit 21*a*. The generated temporal envelope information may be encoded/quantized (Step S21-2). The temporal envelope information may be temporal envelope information that is obtained in the demultiplexing unit 11*a* of the audio decoding device 11.

Further, in the case where processing related to temporal envelope shaping, which is different from the processing in the present invention, is performed when generating a decoded signal in the decoding unit of the audio decoding device 11, and information concerning this temporal envelope shaping processing is stored in the audio encoding device 21, for example, the temporal envelope information may be generated using this information. For example, information as to whether or not to shape the temporal envelope in the selective temporal envelope shaping unit 11*b* of the audio decoding device 11 may be generated based on information as to whether or not to perform temporal envelope shaping processing which is different from the one in the present invention.

Further, in the case where the selective temporal envelope shaping unit 11*b* of the audio decoding device 11 performs the temporal envelope shaping using the linear prediction analysis that is described in the first example of the selective temporal envelope shaping unit 10*b* of the audio decoding device 10 according to the first embodiment, for example, it may generate the temporal envelope information by using a result of the linear prediction analysis of a transform coefficient(s) (or sub-band samples) of an input audio signal, just like the linear prediction analysis in this temporal envelope shaping. To be specific, a prediction gain by the linear prediction analysis may be calculated, and the temporal envelope information may be generated based on the prediction gain. When calculating the prediction gain, linear prediction analysis may be performed on the transform coefficient(s) (or sub-band sample(s)) of the whole of the frequency band(s) of an input audio signal, or linear prediction analysis may be performed on the transform coefficient(s) (or sub-band sample(s)) of a part of the frequency band(s) of an input audio signal. Furthermore, an input audio signal may be divided into a plurality of frequency band segments, and linear prediction analysis of the transform coefficient(s) (or sub-band sample(s)) may be performed for each frequency band segment, and because a plurality of prediction gains are obtained in this case, the temporal envelope information may be generated by using the plurality of prediction gains.

Further, for example, information obtained when encoding the audio signal in the encoding unit 21*a* may be at least one of information obtained when encoding by the encoding scheme corresponding to the first decoding scheme (first encoding scheme) and information obtained when encoding by the encoding scheme corresponding to the second decoding scheme (second encoding scheme) in the case where the decoding unit 10*a* has the configuration of the second example.

The multiplexing unit 21*c* multiplexes the encoded sequence obtained by the encoding unit and the temporal envelope information obtained by the temporal envelope information encoding unit and outputs them (Step S21-3).

Third Embodiment

Figure 18:
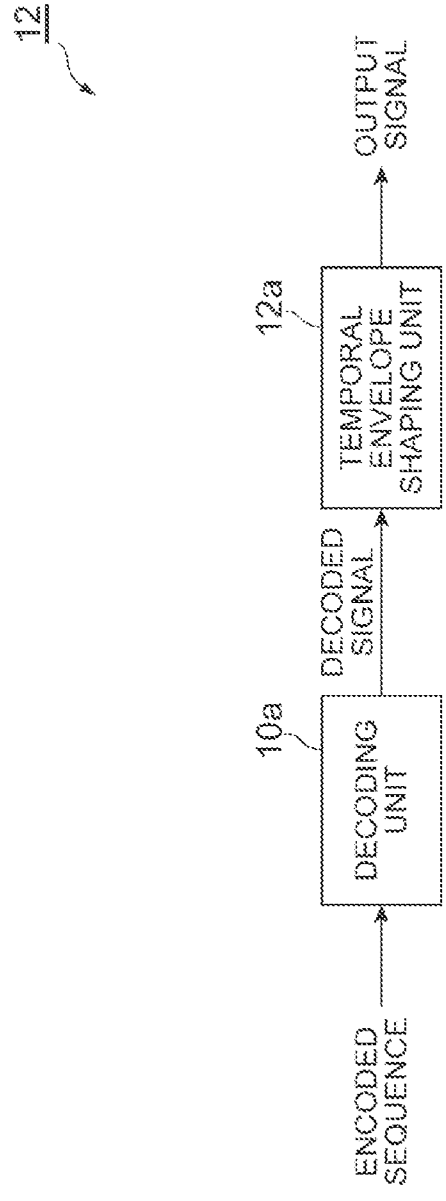
FIG. 18 is a view showing the configuration of an audio decoding device 12 according to a third embodiment.

FIG. 18 is a view showing the configuration of an audio decoding device 12 according to a third embodiment. A communication device of the audio decoding device 12 receives an encoded sequence of an audio signal and outputs a decoded audio signal to the outside. As shown in FIG. 18, the audio decoding device 12 functionally includes a decoding unit 10*a* and a temporal envelope shaping unit 12*a*.

Figure 19:
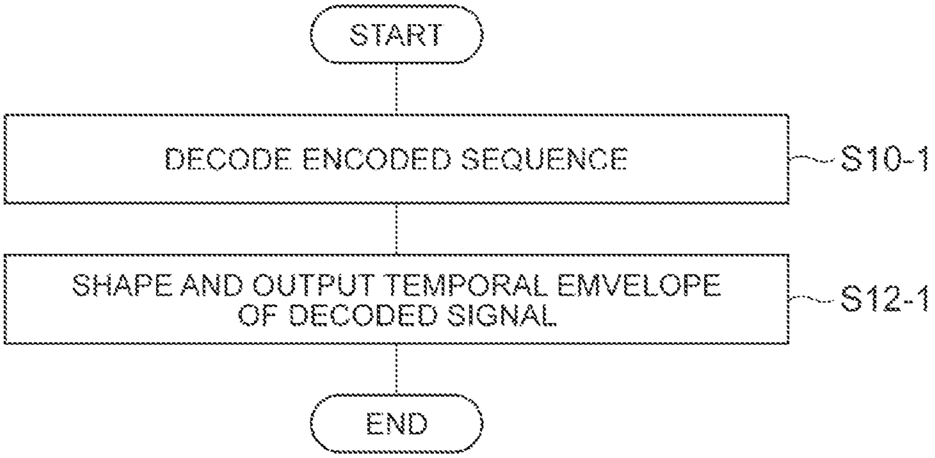
FIG. 19 is a flowchart showing the operation of the audio decoding device 12 according to the third embodiment.

FIG. 19 is a flowchart showing the operation of the audio decoding device 12 according to the third embodiment. The decoding unit 10*a* decodes an encoded sequence and generates a decoded signal (Step S10-1). Then, the temporal envelope shaping unit 12*a* shapes the temporal envelope of the decoded signal that is output from the decoding unit 10*a* into a desired temporal envelope (Step S12-1). For temporal envelope shaping, a method that makes the temporal envelope flat by filtering with the linear prediction inverse filter using a linear prediction coefficient(s) obtained by linear prediction analysis of a transform coefficient(s) of a decoded signal, or a method that makes the temporal envelope rising or falling by filtering with the linear prediction filter using the linear prediction coefficient(s) may be used, as described in the first embodiment. Further, the strength of making the temporal envelope flat, rising or falling may be adjusted using a bandwidth expansion ratio, or the temporal envelope shaping in the above-described example may be performed on a sub-sample(s) at arbitrary time t of a sub-band signal obtained by transforming a decoded signal into a frequency-domain signal by a filter bank, instead of a transform coefficient(s) of the decoded signal. Furthermore, as described in the first embodiment, the amplitude of the sub-band signal may be corrected to achieve a desired temporal envelope in an arbitrary time segment, and, for example, the temporal envelope may be flattened by changing the amplitude of the sub-band signal into the average amplitude of a frequency component(s) (or frequency band(s)) where temporal envelope shaping is to be performed. The above-described temporal envelope shaping may be performed on the entire frequency band of the decoded signal, or may be performed on a specified frequency band(s).

Fourth Embodiment

Figure 20:
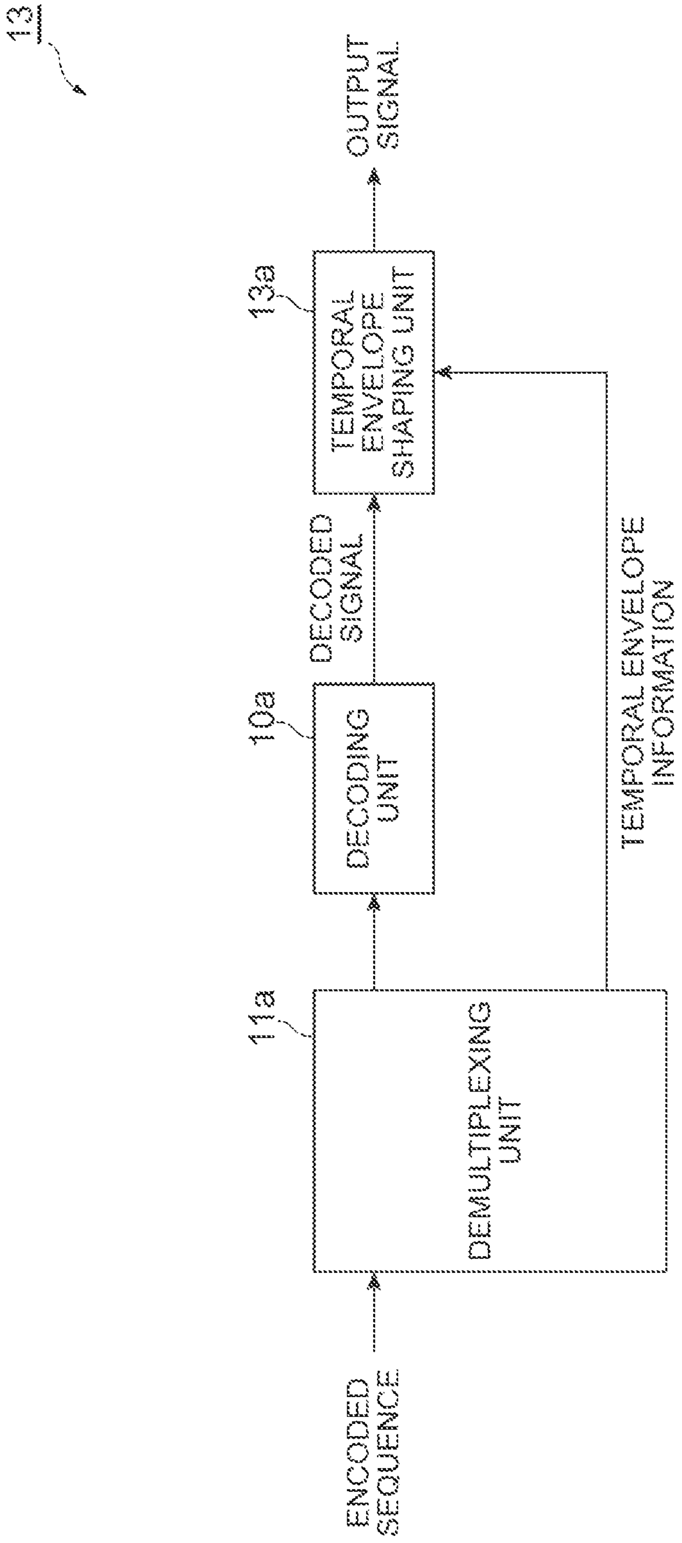
FIG. 20 is a view showing the configuration of an audio decoding device 13 according to a fourth embodiment.

FIG. 20 is a view showing the configuration of an audio decoding device 13 according to a fourth embodiment. A communication device of the audio decoding device 13 receives an encoded sequence of an audio signal and outputs a decoded audio signal to the outside. As shown in FIG. 20, the audio decoding device 13 functionally includes a demultiplexing unit 11*a*, a decoding unit 10*a*, and a temporal envelope shaping unit 13*a*.

Figure 21:
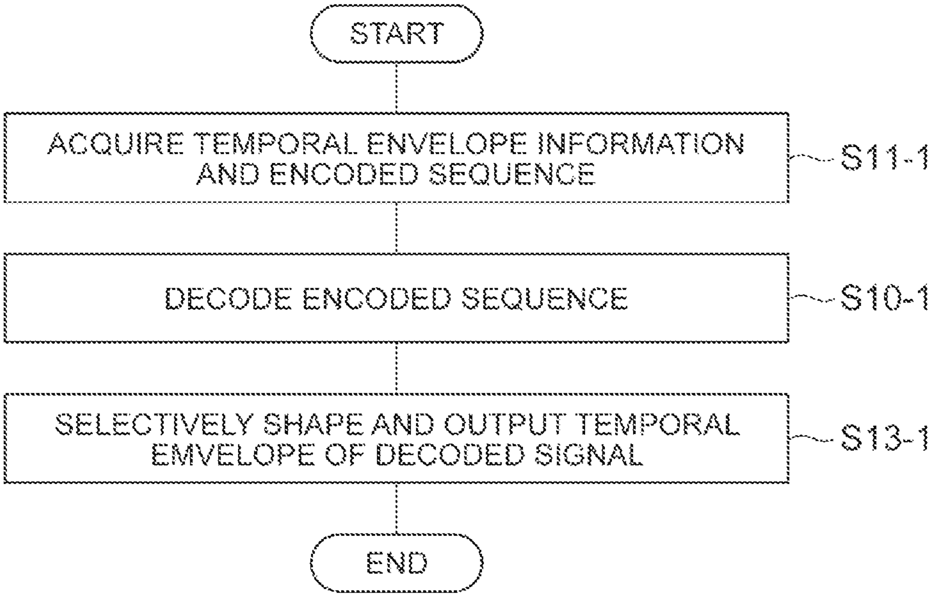
FIG. 21 is a flowchart showing the operation of the audio decoding device 13 according to the fourth embodiment.

FIG. 21 is a flowchart showing the operation of the audio decoding device 13 according to the fourth embodiment. The demultiplexing unit 11*a* divides an encoded sequence into the encoded sequence to obtain a decoded signal and temporal envelope information by decoding/inverse quantization (Step S11-1). The decoding unit 10*a* decodes the encoded sequence and thereby generates a decoded signal (Step S10-1). The temporal envelope shaping unit 13*a* receives the temporal envelope information from the demultiplexing unit 11*a*, and shapes the temporal envelope of the decoded signal that is output from the decoding unit 10*a* into a desired temporal envelope based on the temporal envelope information (Step S13-1).

The temporal envelope information may be information indicating that the temporal envelope of an input signal that has been encoded by an encoding device is flat, information indicating that the temporal envelope of the input signal is rising, or information indicating that the temporal envelope of the input signal is falling, as described in the second embodiment. Further, for example, the temporal envelope information may be information indicating the degree of flatness of the temporal envelope of the input signal, information indicating the degree of rising of the temporal envelope of the input signal, information indicating the degree of falling of the temporal envelope of the input signal, or information indicating whether or not to shape the temporal envelope in the temporal envelope shaping unit 13*a*.

[Hardware Configuration]

Each of the above-described audio decoding devices 10, 11, 12, 13 and the audio encoding device 21 is composed of hardware such as CPU. FIG. 11 is a view showing an example of hardware configurations of the audio decoding devices 10, 11, 12, 13 and the audio encoding device 21. As shown in FIG. 11, each of the audio decoding devices 10, 11, 12, 13 and the audio encoding device 21 is physically configured as a computer system including a CPU 100, a RAM 101 and a ROM 102 as a main storage device, an input/output device 103 such as a display, a communication module 104, an auxiliary storage device 105 and the like.

Figure 22:
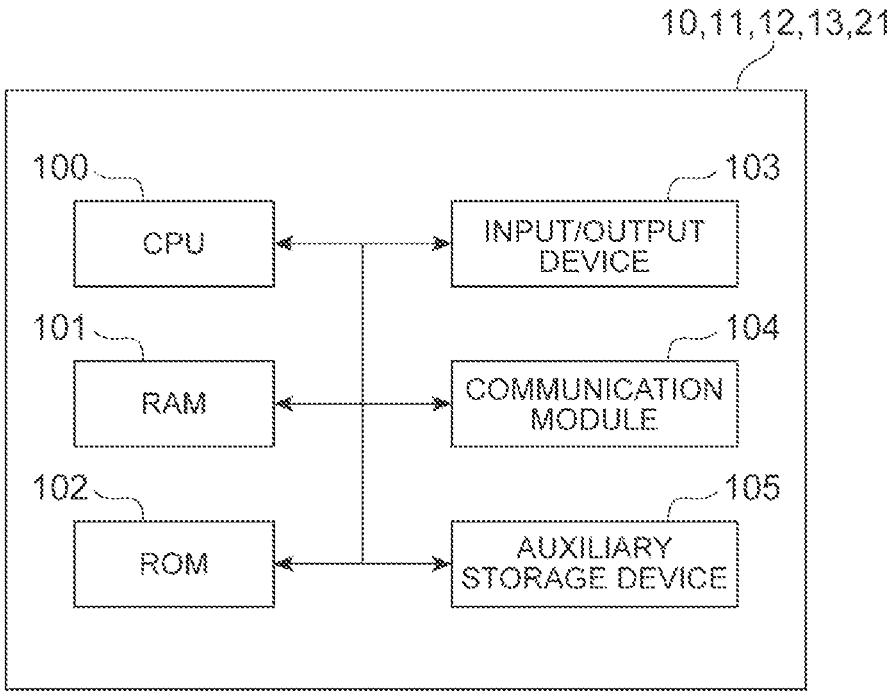
FIG. 22 is a view showing the hardware configuration of a computer that functions as the audio decoding device or the audio encoding device according to this embodiment.

The functions of each functional block of the audio decoding devices 10, 11, 12, 13 and the audio encoding device 21 are implemented by loading given computer software onto hardware such as the CPU 100, the RAM 101 or the like shown in FIG. 22, making the input/output device 103, the communication module 104 and the auxiliary storage device 105 operate under control of the CPU 100, and performing data reading and writing in the RAM 101.

[Program Structure]

An audio decoding program 50 and an audio encoding program 60 that cause a computer to execute processing by the above-described audio decoding devices 10, 11, 12, 13 and the audio encoding device 21, respectively, are described hereinafter.

Figure 23:
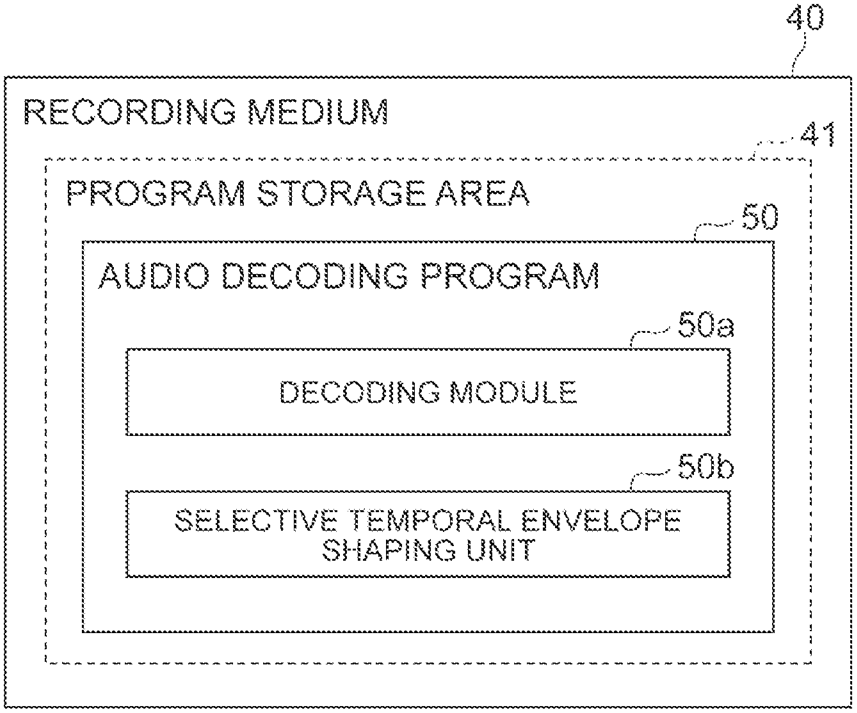
FIG. 23 is a view showing a program structure for causing a computer to function as the audio decoding device.

As shown in FIG. 23, the audio decoding program 50 is stored in a program storage area 41 formed in a recording medium 40 that is inserted into a computer and accessed, or included in a computer. To be specific, the audio decoding program 50 is stored in the program storage area 41 formed in the recording medium 40 that is included in the audio decoding device 10.

The functions implemented by executing a decoding module 50*a* and a selective temporal envelope shaping module 50*b* of the audio decoding program 50 are the same as the functions of the decoding unit 10*a* and the selective temporal envelope shaping unit 10*b* of the audio decoding device 10 described above, respectively. Further, the decoding module 50*a* includes modules for serving as the decoding/inverse quantization unit 10*a*A, the decoding related information output unit 10*a*B and the time-frequency inverse transform unit 10*a*C. Further, the decoding module 50*a* may include modules for serving as the encoded sequence analysis unit 10*a*D, the first decoding unit 10*a*E and the second decoding unit 10*a*F.

Further, the selective temporal envelope shaping module 50*b* includes modules for serving as the time-frequency transform unit 10*b*A, the frequency selection unit 10*b*B, the frequency selective temporal envelope shaping unit 10*b*C and the time-frequency inverse transform unit 10*b*D.

Further, in order to serve as the above-described audio decoding device 11, the audio decoding program 50 includes modules for serving as the demultiplexing unit 11*a*, the decoding unit 10*a* and the selective temporal envelope shaping unit 11*b*.

Further, in order to serve as the above-described audio decoding device 12, the audio decoding program 50 includes modules for serving as the decoding unit 10*a* and the temporal envelope shaping unit 12*a*.

Further, in order to serve as the above-described audio decoding device 13, the audio decoding program 50 includes modules for serving as the demultiplexing unit 11*a*, the decoding unit 10*a* and the temporal envelope shaping unit 13*a*.

Figure 24:
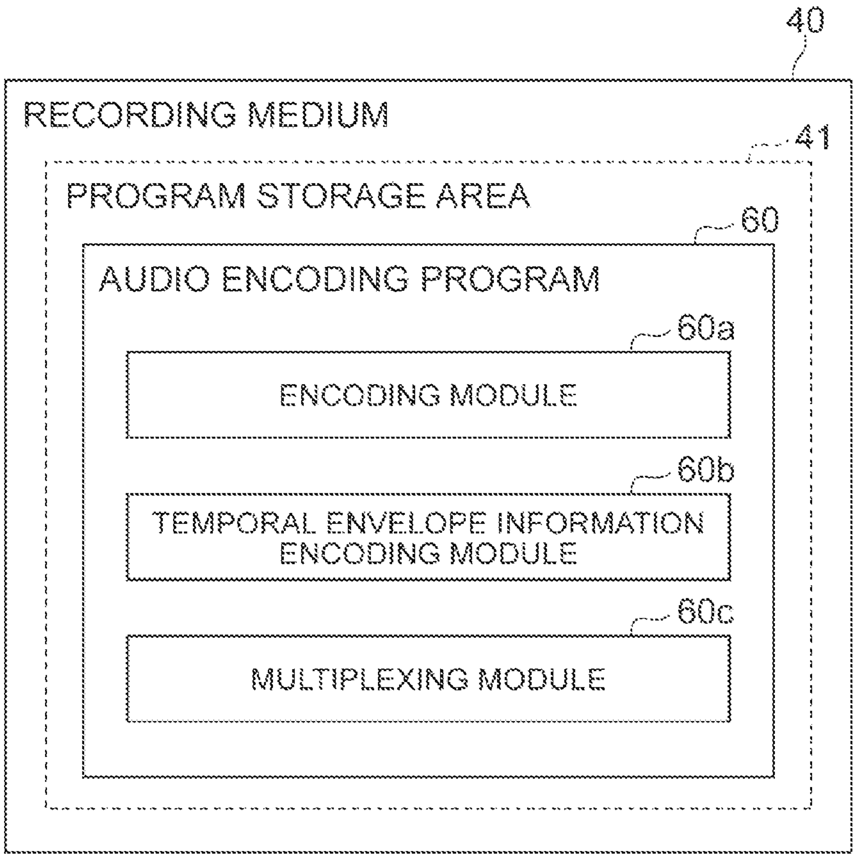
FIG. 24 is a view showing a program structure for causing a computer to function as the audio encoding device.

Further, as shown in FIG. 24, the audio encoding program 60 is stored in a program storage area 41 formed in a recording medium 40 that is inserted into a computer and accessed, or included in a computer. To be specific, the audio encoding program 60 is stored in the program storage area 41 formed in the recording medium 40 that is included in the audio encoding device 20.

The audio encoding program 60 includes an encoding module 60*a*, a temporal envelope information encoding module 60*b*, and a multiplexing module 60*c*. The functions implemented by executing the encoding module 60*a*, the temporal envelope information encoding module 60*b* and the multiplexing module 60*c* are the same as the functions of the encoding unit 21*a*, the temporal envelope information encoding unit 21*b* and the multiplexing unit 21*c* of the audio encoding device 21 described above, respectively.

Note that a part or the whole of each of the audio decoding program 50 and the audio encoding program 60 may be transmitted through a transmission medium such as a communication line, received and recorded (including being installed) by another device. Further, each module of the audio decoding program 50 and the audio encoding program 60 may be installed not in one computer but in any of a plurality of computers. In this case, the processing of each of the audio decoding program 50 and the audio encoding program 60 is performed by a computer system composed of the plurality of computers.

REFERENCE SIGNS LIST

10*a*F-1 inverse quantization unit
10 audio decoding device
10*a* decoding unit
10*a*A decoding/inverse quantization unit
10*a*B decoding related information output unit
10*a*C time-frequency inverse transform unit
10*a*D encoded sequence analysis unit
10*a*E first decoding unit
10*a*E-a first decoding/inverse quantization unit
10*a*E-b first decoding related information output unit
10*a*F second decoding unit
10*a*F-a second decoding/inverse quantization unit
10*a*F-b second decoding related information output unit
10*a*F-c decoded signal synthesis unit
10*b* selective temporal envelope shaping unit
10*b*A time-frequency transform unit
10*b*B frequency selection unit
10*b*C frequency selective temporal envelope shaping unit
10*b*D time-frequency inverse transform unit
11 audio decoding device
11*a* demultiplexing unit
11*b* selective temporal envelope shaping unit
12 audio decoding device
12*a* temporal envelope shaping unit
13 audio decoding device
13*a* temporal envelope shaping unit
21 audio encoding device
21*a* encoding unit
21*b* temporal envelope information encoding unit
21*c* multiplexing unit

What is claimed is:

1. An audio decoding device that decodes an encoded audio signal and outputs the audio signal, comprising a processor programmed to implement:

decoding an encoded sequence containing the encoded audio signal and obtain a decoded signal;

shaping a temporal envelope of a decoded signal in a frequency band based on decoding related information concerning decoding of the encoded sequence; and wherein shaping a temporal envelope of a decoded signal in a frequency band comprises replacing the decoded signal corresponding to a frequency band where the temporal envelope is not to be shaped with another signal in a frequency domain.

2. An audio decoding device that decodes an encoded audio signal and outputs the audio signal, comprising a processor programmed to implement:

extracting temporal envelope information concerning a temporal envelope of an audio signal from an input encoded sequence;

decoding the encoded sequence and obtaining a decoded signal;

shaping a temporal envelope of a decoded signal in a frequency band based on at least one of the temporal envelope information and decoding related information concerning decoding of the encoded sequence; and wherein shaping a temporal envelope of a decoded signal in a frequency band comprises replacing the decoded signal corresponding to a frequency band where the temporal envelope is not to be shaped with another signal in a frequency domain.

3. The audio decoding device according to claim 2, wherein decoding the encoded sequence and obtaining a decoded signal comprises:

performing at least one of decoding and inversely quantizing the encoded sequence and obtaining a frequency-domain decoded signal; and outputting, as decoding related information, at least one of information obtained in the course of at least one of decoding and inversely quantizing the encoded sequence and information obtained by analyzing the encoded sequence.

4. The audio decoding device according to claim 2, wherein the processor is programmed to further implement:

extracting a first encoded sequence and a second encoded sequence from the encoded sequence;

performing at least one of decoding and inversely quantizing the first encoded sequence, obtaining a first decoded signal, and obtaining first decoding related information as the decoding related information; and obtaining and outputting a second decoded signal by using at least one of the second encoded sequence and the first decoded signal, and outputting second decoding related information as the decoding related information.

5. The audio decoding device according to claim 4, wherein performing at least one of decoding and inversely quantizing the first encoded sequence, obtaining a first decoded signal, and obtaining first decoding related information as the decoding related information comprises:

performing at least one of decoding and inversely quantizing the first encoded sequence and obtaining a first decoded signal; and outputting, as first decoding related information, at least one of information obtained in the course of at least one of decoding and inversely quantizing the first encoded sequence and information obtained by analyzing the first encoded sequence.

6. The audio decoding device according to claim 4, wherein obtaining and outputting a second decoded signal comprises:

obtaining a second decoded signal by using at least one of the second encoded sequence and the first decoded signal; and outputting, as second decoding related information, at least one of information obtained in the course of obtaining the second decoded signal and information obtained by analyzing the second encoded sequence.

7. The audio decoding device according to claim 1, wherein shaping a temporal envelope of a decoded signal in a frequency band comprises:

shaping a temporal envelope in each frequency band of the frequency-domain decoded signal based on the decoding related information; and transforming the frequency-domain decoded signal where the temporal envelope in each frequency band has been shaped into a time-domain signal.

8. The audio decoding device according to claim 1, wherein the decoding related information is information concerning the number of encoded bits in each frequency band.

9. The audio decoding device according to claim 1, wherein the decoding related information is information concerning a quantization value in each frequency band.

10. The audio decoding device according to claim 1, wherein the decoding related information is information concerning an encoding scheme in each frequency band.

11. The audio decoding device according to claim 1, wherein the decoding related information is information concerning a noise component to be filled to each frequency band.

12. The audio decoding device according to claim 1, wherein shaping a temporal envelope of a decoded signal in a frequency band shapes the decoded signal corresponding to a frequency band where the temporal envelope is to be shaped into a desired temporal envelope with use of a filter using a linear prediction coefficient obtained by linear prediction analysis of the decoded signal in the frequency domain.

13. An audio decoding device that decodes an encoded audio signal and outputs the audio signal, comprising a processor programmed to implement:

decoding an encoded sequence containing the encoded audio signal and obtain a decoded signal;

shaping the decoded signal into a desired temporal envelope by filtering the decoded signal in a frequency domain with use of a filter using a linear prediction coefficient obtained by linear prediction analysis of the decoded signal in the frequency domain; and wherein shaping the decoded signal into a desired temporal envelope comprises replacing the decoded signal corresponding to a frequency band where the temporal envelope is not to be shaped with another signal in a frequency domain.

14. An audio decoding method of an audio decoding device that decodes an encoded audio signal and outputs the audio signal, the method being executed by processor to implement steps comprising:

decoding an encoded sequence containing the encoded audio signal and obtaining a decoded signal;

shaping a temporal envelope of a decoded signal in a frequency band based on decoding related information concerning decoding of the encoded sequence; and wherein shaping a temporal envelope of a decoded signal in a frequency band comprises a step of replacing the decoded signal corresponding to a frequency band where the temporal envelope is not to be shaped with another signal in a frequency domain.

15. An audio decoding method of an audio decoding device that decodes an encoded audio signal and outputs the audio signal, the method being executed by a processor to implement steps comprising:

extracting temporal envelope information concerning a temporal envelope of an audio signal from an encoded sequence;

decoding the encoded sequence and obtaining a decoded signal;

shaping a temporal envelope of a decoded signal in a frequency band based on at least one of the temporal envelope information and decoding related information concerning decoding of the encoded sequence; and wherein shaping a temporal envelope of a decoded signal in a frequency band comprises a step of replacing the decoded signal corresponding to a frequency band where the temporal envelope is not to be shaped with another signal in a frequency domain.

16. An audio decoding method of an audio decoding device that decodes an encoded audio signal and outputs the audio signal, the method being executed by a processor to implement steps comprising:

decoding an encoded sequence containing the encoded audio signal and obtaining a decoded signal;

shaping the decoded signal into a desired temporal envelope by filtering the decoded signal in a frequency domain with use of a filter using a linear prediction coefficient obtained by linear prediction analysis of the decoded signal in the frequency domain; and wherein shaping the decoded signal into a desired temporal envelope comprises a step of replacing the decoded signal corresponding to a frequency band where the temporal envelope is not to be shaped with another signal in a frequency domain.

* * * * *